US012665000B2

(12) United States Patent
Maeto

(10) Patent No.: US 12,665,000 B2
(45) Date of Patent: Jun. 23, 2026

(54) MAGNETIC DISK APPARATUS

(71) Applicants: Kabushiki Kaisha Toshiba, Tokyo
(JP); **Toshiba Electronic Devices &
Storage Corporation**, Tokyo (JP)

(72) Inventor: Nobuhiro Maeto, Yokohama Kanagawa
(JP)

(73) Assignees: Kabushiki Kaisha Toshiba, Kawasaki
(JP); **Toshiba Electronic Devices &
Storage Corporation**, Kawasaki (JP)

( * ) Notice: Subject to any disclaimer, the term of this
patent is extended or adjusted under 35
U.S.C. 154(b) by 0 days.

(21) Appl. No.: 19/174,570

(22) Filed: Apr. 9, 2025

(65) Prior Publication Data

US 2026/0080901 A1     Mar. 19, 2026

(30) Foreign Application Priority Data

Sep. 19, 2024     (JP) ................................. 2024-161965

(51) Int. Cl.
*G11B 5/55*        (2006.01)
*G11B 5/596*       (2006.01)
*G11B 20/18*       (2006.01)

(52) U.S. Cl.
CPC .................................... *G11B 20/18* (2013.01)

(58) Field of Classification Search
CPC .. G11B 5/09; G11B 5/00; G11B 5/012; G11B
5/5556; G11B 5/56; G11B 5/59627;
G11B 27/36; G11B 5/59638; G11B
20/1258; G11B 20/10314; G11B 27/10;
G11B 2020/1278; G11B 2020/1292;

G11B 5/6005; G11B 5/59633; G11B
5/5927; G11B 5/5961; G11B 5/596;
G11B 20/1217; G11B 5/54; G11B 20/12;
G11B 2005/0005
USPC ................................................ 360/75, 77.02
See application file for complete search history.

(56) References Cited

U.S. PATENT DOCUMENTS

| | | | |
|---|---|---|---|
| 9,280,987 B1 | 3/2016 | Bao et al. | |
| 10,748,567 B1 * | 8/2020 | Zaitsu ............. | G11B 20/10388 |
| 2020/0090700 A1 | 3/2020 | Kawabe | |
| 2023/0260540 A1 | 8/2023 | Maeto | |
| 2023/0335158 A1 | 10/2023 | Ravindran et al. | |

FOREIGN PATENT DOCUMENTS

| | | |
|---|---|---|
| JP | 2020-47328 A | 3/2020 |
| JP | 2023-119547 A | 8/2023 |

* cited by examiner

*Primary Examiner* — Nabil Z Hindi
(74) *Attorney, Agent, or Firm* — Kim & Stewart LLP

(57) ABSTRACT
According to one embodiment, a controller of a magnetic
disk apparatus calculates a first threshold for each of first
positions. The first threshold is calculated based on quality
of second positions. The second positions correspond to the
first positions. During a write operation on the first track, the
controller calculates a first amount and compares the first
amount with a second threshold. The first amount is obtained
by accumulating an excess amount of a squeeze amount over
the first threshold for all second positions included in a range
adjacent to a part in the circumferential direction where
write by the write operation is completed. The squeeze
amount is a narrowed amount of a width of the second track
from a design value by the write operation. Interruption of
the write operation and a protection operation of the second
track are performed based on a result of the comparison.

20 Claims, 15 Drawing Sheets

FIG.1

TRACK
41

MAGNETIC DISK
11

ROTATIONAL
DIRECTION

WRITE/READ DIRECTION

42
SERVO
AREA

43
DATA AREA

OUTER SIDE

RADIAL
DIRECTION

Track #1

Track #2

Track #3

Track #4

Track #5

WHw   TW

ORDER OF
WRITE

INNER SIDE

DATA SECTOR POSITION IN TRACK

BIT ERROR RATE

MAGNETIC DISK APPARATUS

CROSS-REFERENCE TO RELATED APPLICATIONS

This application is based upon and claims the benefit of priority from Japanese Patent Application No. 2024-161965, filed on Sep. 19, 2024; the entire contents of which are incorporated herein by reference.

FIELD

Embodiments described herein relate generally to a magnetic disk apparatus.

BACKGROUND

In general, a magnetic disk apparatus is configured to be capable of performing error correction on data written to each track. In a case where there is a possibility that data of an adjacent track becomes uncorrectable due to write to a write target track, a magnetic disk apparatus executes a protection operation of interrupting the write operation on the write target track and protecting the data of the adjacent track.

BRIEF DESCRIPTION OF THE DRAWINGS

FIG. 1 is a schematic diagram illustrating an example of a configuration of a magnetic disk apparatus according to a first embodiment;

DETAILED DESCRIPTION

Figure 2:
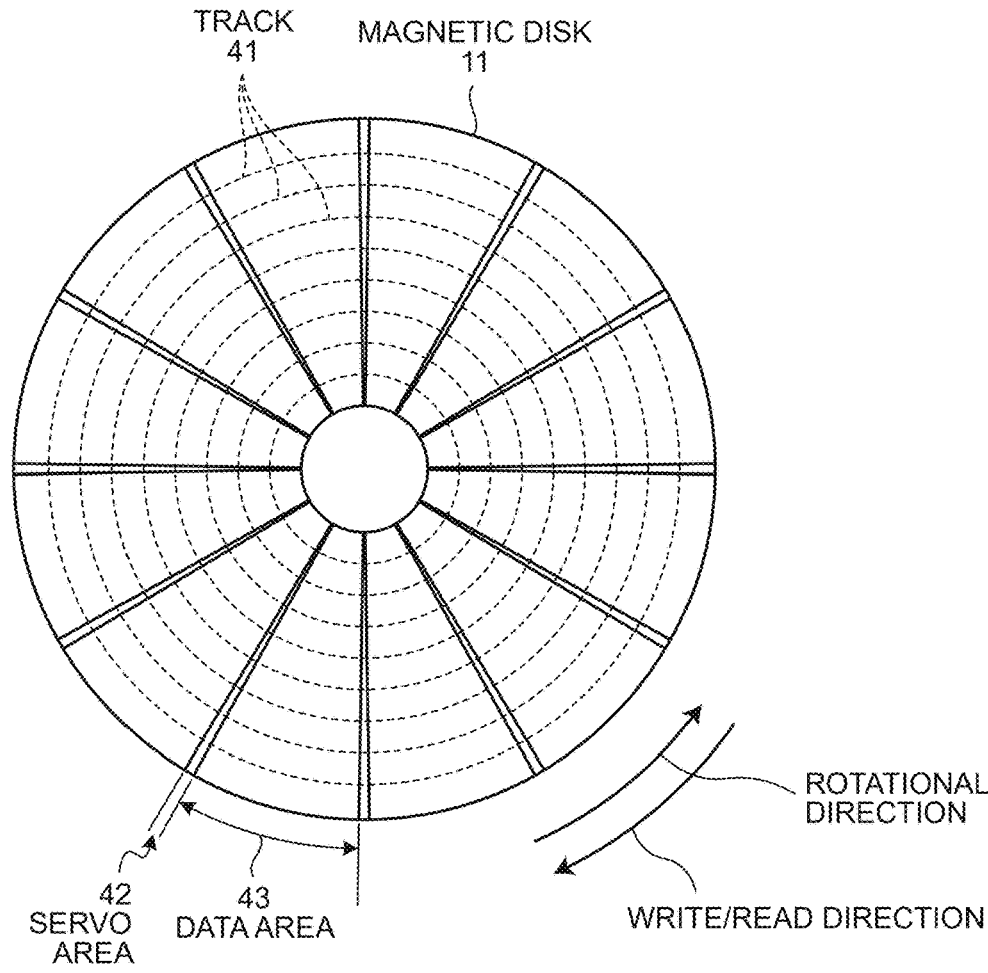
FIG. 2 is a view illustrating an example of a configuration of a magnetic disk according to the first embodiment.

According to the present embodiment, a magnetic disk apparatus includes a magnetic disk, a magnetic head, and a controller. On the magnetic disk, tracks are provided. The tracks include servo sectors in which servo information is recorded. The servo sectors are arranged at intervals in a circumferential direction of the magnetic disk. The tracks include a first track and a second track. The second track is adjacent to the first track in a radial direction of the magnetic disk and being subjected to write before the first track. The magnetic head is configured to write and read data to and from the magnetic disk. The controller is configured to calculate a first threshold relative to each of multiple first positions located in the circumferential direction. The first threshold is individually calculated for each of the multiple first positions based on quality of one or more of multiple second positions located in the circumferential direction. The one or more of the multiple second positions corresponding to the multiple first positions. The controller starts a write operation on the first track, and execute a first operation when the magnetic head passes over each of the servo sectors during the write operation. The first operation is an operation of calculating a first amount and comparing the first amount with a second threshold. The first operation is executed based on the servo information read every time the magnetic head passes over each of the servo sectors. The first amount is obtained by accumulating an excess amount of a squeeze amount over the first threshold for all second positions included in a range adjacent to a part in the circumferential direction where write by the write operation is completed among the multiple second positions. The squeeze amount is a narrowed amount of a width of the second track from a design value by the write operation. The controller performs interruption of the write operation and performs a protection operation of protecting data of the second track, based on a comparison result between the first amount and the second threshold.

Hereinafter, magnetic disk apparatuses according to embodiments will be described in detail with reference to the attached drawings. Note that the present invention is not limited to these embodiments.

First Embodiment

Figure 1:
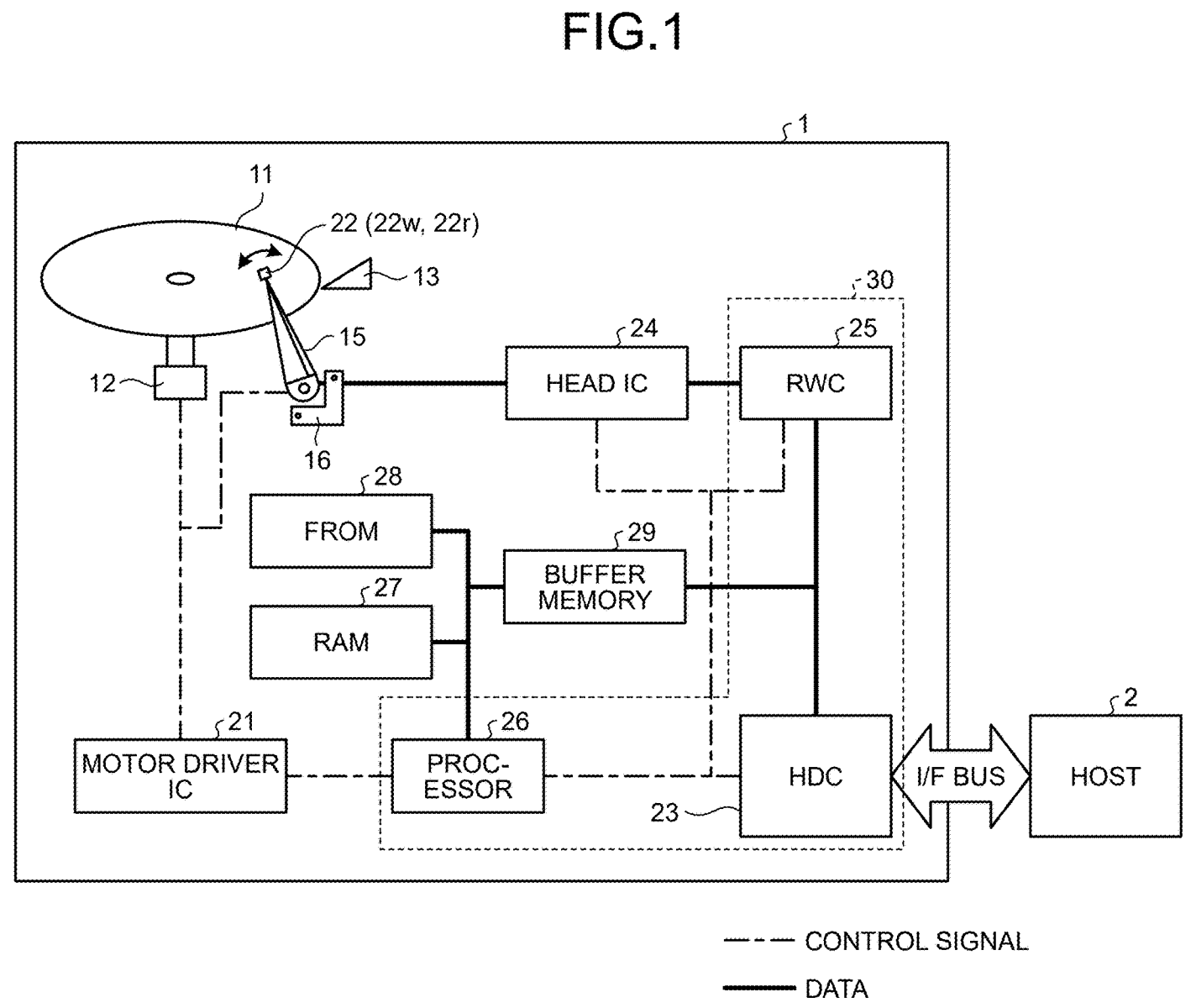

FIG. 1 is a schematic diagram illustrating an example of a configuration of a magnetic disk apparatus 1 according to a first embodiment.

The magnetic disk apparatus 1 is connected to a host 2. The magnetic disk apparatus 1 can receive access commands such as a write command and a read command from the host 2.

The magnetic disk apparatus 1 includes a magnetic disk 11 having a recording surface formed on its surface. The magnetic disk apparatus 1 writes and reads data to and from the magnetic disk 11 (more precisely, the recording surface of the magnetic disk 11) in response to the access commands. Note that the magnetic disk apparatus 1 may include a plurality of the magnetic disks 11, but in the first embodiment, the magnetic disk apparatus 1 is assumed to include one magnetic disk 11 in order to simplify description and illustrations.

The write and read of data are performed via the magnetic head 22. Specifically, the magnetic disk apparatus 1 includes a spindle motor 12, a motor driver integrated circuit (IC) 21, a magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26, in addition to the magnetic disk 11.

The magnetic disk 11 is rotated at a predetermined rotational speed by the spindle motor 12 mounted on a spindle of the magnetic disk 11. The spindle motor 12 is driven by the motor driver IC 21.

The motor driver IC 21 controls the rotation of the spindle motor 12 and the rotation of the VCM 16.

The magnetic head 22 writes data and reads data to and from the magnetic disk 11 by a write element $22w$ and a read element $22r$ provided therein. The magnetic head 22 is attached to a distal end of the actuator arm 15. The magnetic head 22 is moved along the radial direction of the magnetic disk 11 by the VCM 16 driven by the motor driver IC 21.

When the rotation of the magnetic disk 11 is stopped or the like, the magnetic head 22 is moved onto the ramp 13. The ramp 13 is configured to hold the magnetic head 22 at a position separated from the magnetic disk 11.

The head IC 24 amplifies a signal read by the magnetic head 22 from the magnetic disk 11 and outputs the amplified signal to be supplied to the RWC 25 during a read operation. In addition, the head IC 24 amplifies a signal corresponding to write target data supplied from the RWC 25 and supplies the amplified signal to the magnetic head 22 during a write operation.

The HDC 23 controls transmission and reception of data performed with the host 2 via an I/F bus, controls the buffer memory 29 and the like.

The buffer memory 29 is used as a buffer of data to be transmitted to and received from the host 2. The buffer memory 29 may be used for temporarily storing the data written to the magnetic disk 11 or the data read from the magnetic disk 11.

The buffer memory 29 is configured using, for example, a volatile memory that can operate at high speed. A type of the memory constituting the buffer memory 29 is not limited to a specific type. The buffer memory 29 can be configured using a dynamic random access memory (DRAM), a static random access memory (SRAM), or a combination thereof.

The RWC 25 performs modulation including error correction coding on write target data supplied from the HDC 23, and supplies the modulated data to the head IC 24. In addition, the RWC 25 performs demodulation including error correction and the like on a signal read from the magnetic disk 11 and supplied from the head IC 24, and outputs data obtained by the demodulation to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. Firmware (program data) and various operation parameters are stored in the FROM 28. Note that the firmware may be stored on the magnetic disk 11.

The RAM 27 is configured using, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk apparatus 1 according to the firmware stored in the FROM 28 or the magnetic disk 11. The processor 26 loads the firmware from the FROM 28 or the magnetic disk 11 into the RAM 27, and executes control of the motor driver IC 21, the head IC 24, the RWC 25, the HDC 23, and the like according to the loaded firmware.

Note that the configuration including the RWC 25, the processor 26, and the HDC 23 can also be regarded as a controller 30. The controller 30 is configured as a system-on-a-chip (SoC) in some cases. The controller 30 is not necessarily configured as the SoC. In addition to these elements, the controller 30 may include another element (for example, the RAM 27, the FROM 28, the buffer memory 29, the RWC 25, or the like).

FIG. 2 is a schematic view illustrating an example of a configuration of the magnetic disk 11 of the first embodiment. The drawing illustrates an example of a rotational direction of the magnetic disk 11. The magnetic head 22 moves relative to the magnetic disk 11 by the rotation of the magnetic disk 11. Therefore, a write/read direction, namely, a direction in which data is written or read by the magnetic head 22 along the circumferential direction is opposite to the rotational direction of the magnetic disk 11.

Servo information is written to the magnetic disk 11 in a manufacturing process by, for example, a servo writer or self-servo write (SSW). FIG. 2 illustrates servo regions 42 arranged radially as an example of the arrangement of servo regions in which the servo information is written. A data region 43 in which data can be written is provided between the servo regions 42.

On the magnetic disk 11, concentric tracks 41 are provided in the radial direction.

The servo information includes a servo mark, a gray code, a burst pattern, and a post code. For writing data to a data sector or reading data from a data sector, the controller 30 generates a positional error signal (PES) based on the servo information read from the servo region 42 by the magnetic head 22. The PES indicates a shift amount in the radial direction from a track center of a target track. The controller 30 executes positioning of the magnetic head 22, namely, seek control and tracking control based on the PES acquired each time the magnetic head 22 passes over the servo region 42. Before the start of the write operation, the controller 30 executes the seek control to move the magnetic head 22 to the write target track 41. Then, the tracking control is executed to maintain the magnetic head 22 on the write target track 41 during a period from immediately before the start of the write operation to the end of the write operation.

Hereinafter, each part of the track 41 segmented by the servo region 42 is denoted as a servo sector SV. Since the servo regions 42 are radially arranged, it can be considered that the servo sectors SV are arranged at intervals in the circumferential direction in each of the tracks 41.

In the data regions 43, data sectors in which data is written are arranged along the track 41. Hereinafter, a piece of data written in one data sector is denoted as a data piece.

As schemes of writing data to a magnetic disk, a scheme called shingled magnetic recording (SMR) and a scheme called conventional magnetic recording (CMR) are known. In the first embodiment, the controller 30 is configured to write data, requested to be written from the host 2, to the magnetic disk 11 by the SMR scheme.

Figure 3:
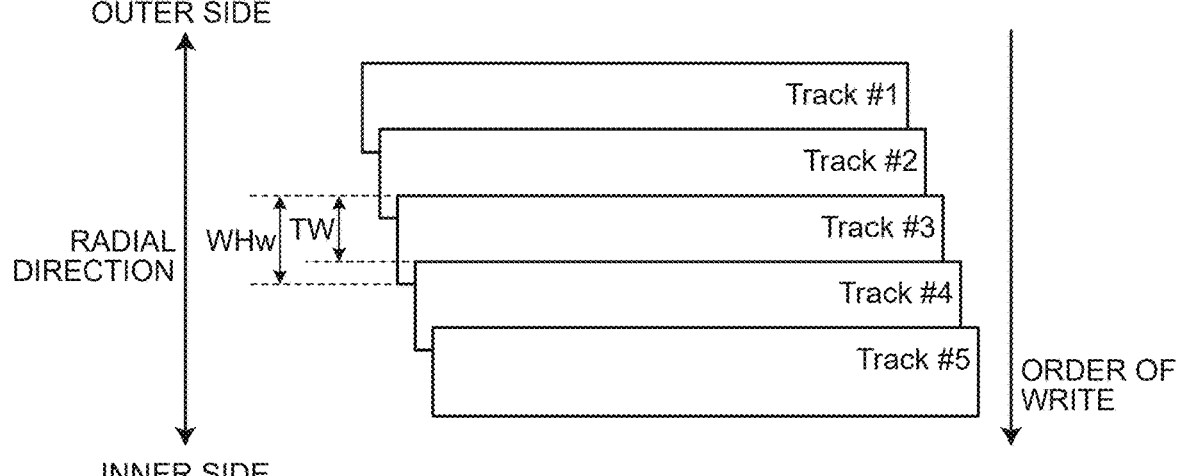
FIG. 3 is a schematic view for describing an SMR scheme used in the magnetic disk apparatus according to the first embodiment.

FIG. 3 is a schematic view for describing the SMR scheme used in the magnetic disk apparatus 1 according to the first embodiment. In the SMR scheme, when write of data (denoted as first data) of a certain track 41 is executed and then write of data (denoted as second data) of another track 41 adjacent to the track 41 in the radial direction is executed, the respective tracks 41 are arranged such that the second data overlaps with part of the first data. Thus, according to the SMR scheme, data for one of two tracks 41 adjacent to each other in the radial direction of the magnetic disk 11 is written so as to overlap with part of data for the other track 41.

Specifically, data of a track #2 is written so as to overlap with part of already written data of a track #1. Data of a track #3 is written so as to overlap with part of the already written data of the track #2. Accordingly, according to the SMR scheme, the overlap of data of one track 41 with part of already written data of an adjacent track is repeated. As a result, each track width TW is narrower than a width (WHw) of the write element 22w, and the recording density can be improved.

According to the SMR scheme, the track width TW is narrower than the width WHw of the write element 22w. Therefore, when part of data corresponding to two or more tracks 41 is updated, data of a track adjacent to the updated data may be destroyed. In order to prevent such destruction of data, the data corresponding to the two or more tracks including the part of data is updated in a batch. An region of the two or more tracks to be updated in a batch is referred to as a band region.

In addition, according to the SMR scheme, a write direction is predetermined such that write can be executed on the tracks 41 in one band region only from either an end on the outer side or an end on the inner side of the magnetic disk toward the other end. In the example illustrated in FIG. 3, write is executed in units of the tracks 41 from the end on the outer side toward the end on the inner side. The controller 30 may be configured such that write is executed in units of the tracks 41 from the end on the inner side toward the end on the outer side. Moreover, the order of write may be individually set for each band region.

In the following description, it is assumed that track numbers corresponding to the arrangement order in the radial direction are given to the tracks 41, respectively, included in the band region, and write in units of the tracks 41 is executed in numerical order of tracks in the SMR scheme.

In a case where the track 41 subjected to write later out of two tracks 41 adjacent to each other in the radial direction is used as a reference, the track 41 subjected to write earlier out of the two tracks 41 is simply denoted as an adjacent track in the present specification. That is, when a track #a is used as a reference, a track #(a−1) corresponds to an adjacent track of the track #a.

Figure 4:
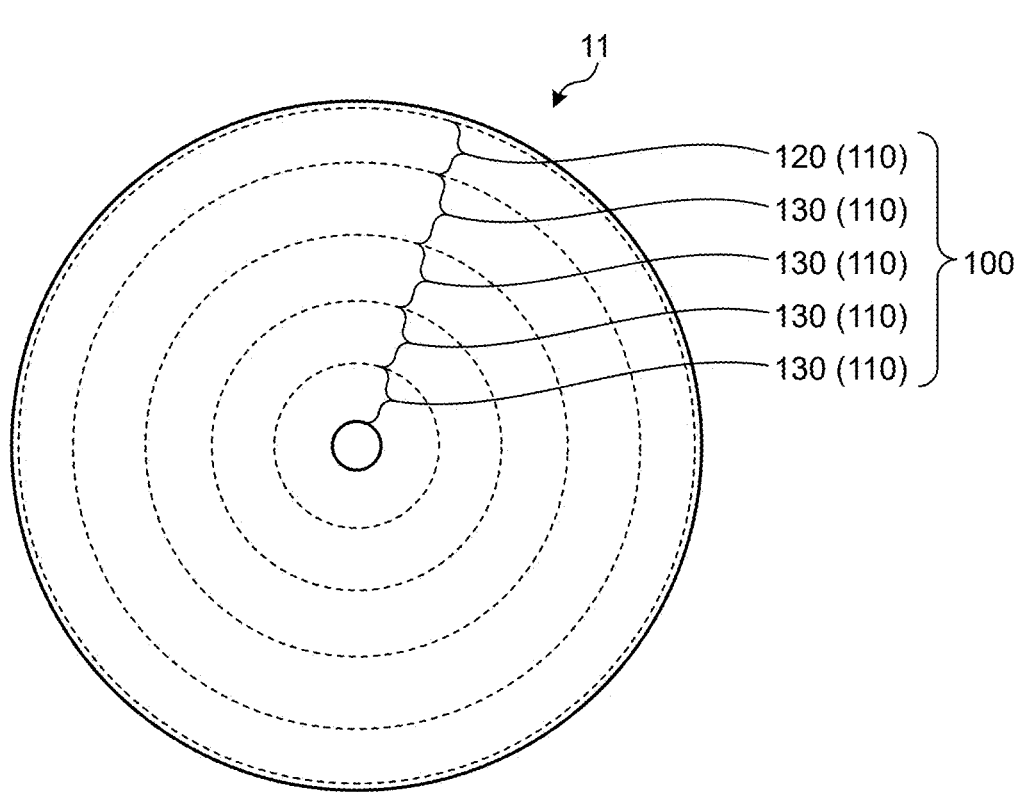
FIG. 4 is a view illustrating an example of a plurality of band regions provided in the magnetic disk according to the first embodiment.

FIG. 4 is a view illustrating an example of a plurality of band regions provided in the magnetic disk 11 according to the first embodiment.

A recording surface 100 of the magnetic disk 11, namely, an area in which the tracks 41 can be arranged, is divided into plural storage areas 110 in the radial direction. The storage areas 110 includes one media cache area 120 and two or more band regions 130. An area called a guard area that cannot be designated as a write destination from the host 2 is provided between the storage areas 110. Note that the guard area is not illustrated in FIG. 4.

The storage area 110 provided on the outermost side in the radial direction in the recording surface 100 is set as the media cache area 120. The media cache area 120 is a storage area used as a place in which data is temporarily stored. Note that a position of the media cache area 120 is not limited to the outermost side. In addition, two or more media cache areas 120 may be provided in the recording surface. In the media cache area 120, data can be written by the CMR scheme.

Note that the CMR scheme is a scheme in which pieces of data of two tracks 41 adjacent to each other in the radial direction of the magnetic disk 11 are written so as not to overlap with each other. According to the CMR scheme, a width of each of the tracks 41 is the same as the width (WHw) of the write element 22w, and thus, data at any position can be updated.

Each of the band regions 130 is provided with a plurality of tracks 41. In each of the band regions 130, data is written by the SMR scheme. The maximum amount of user data to be written in each of the band regions 130, namely, a storage capacity is common in all the band regions 130.

Note that some of the band regions 130 may be configured such that data is written by the CMR scheme.

While a write operation on one track 41 is being executed, the magnetic head 22 may vibrate due to an external factor or the like. When the magnetic head 22 is shifted from a track center toward an adjacent track during the write operation on the write target track 41, a width of the adjacent track is narrowed according to a shift amount of the magnetic head 22 toward the adjacent track. Alternatively, when a trajectory of the adjacent track is shifted toward the write target track 41, the width of the adjacent track is narrowed even if the magnetic head 22 is not shifted toward the adjacent track during the write operation on the write target track 41. An amount by which the width of the adjacent track is reduced from a width of the adjacent track in design due to the write operation is denoted as a squeeze amount SQ. The write operation in which the width of the adjacent track is narrowed from the track width in design is denoted as squeeze write.

When the squeeze amount SQ is larger than a predetermined amount, there is a possibility that a magnetic field of the magnetic head 22 interferes with data written in the adjacent track to damage the data. Further, according to the SMR scheme, since the track width TW is narrower than that in the CMR scheme or the like, the data of the adjacent track is greatly affected by the vibration of the magnetic head 22.

The controller 30 has an error correction function such that original data can be recovered at the time of read even if the data of the adjacent track is damaged by the squeeze write. Specifically, the controller 30 has a sector error correction function and a track error correction function.

Figure 5:
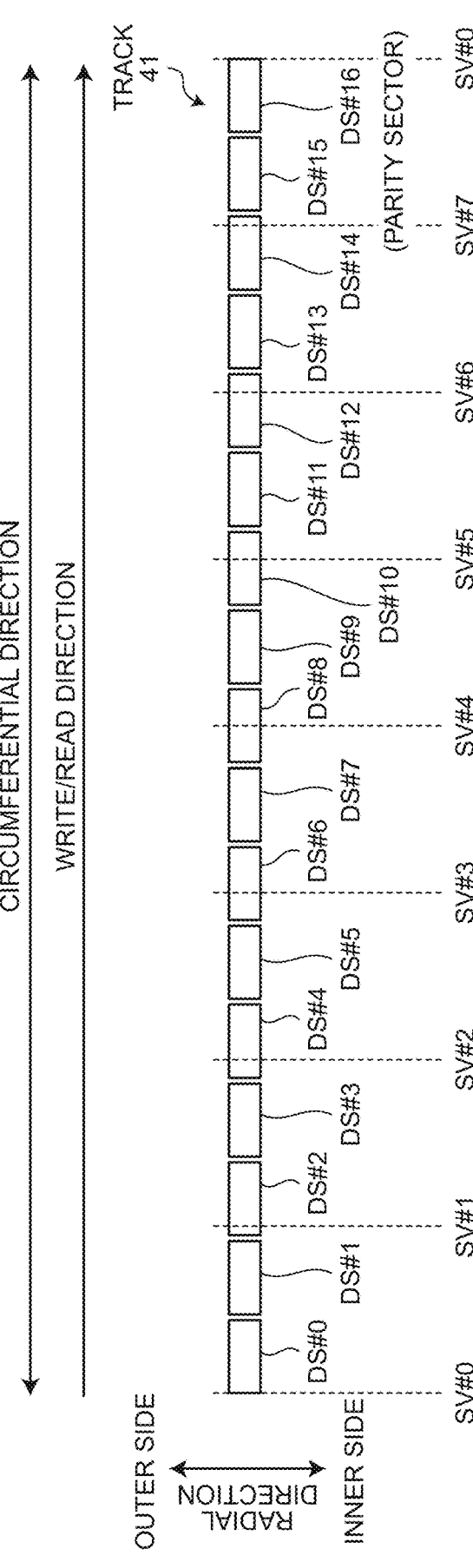
FIG. 5 is a view for describing an error correction function included in a controller according to the first embodiment.

FIG. 5 is a view for describing the error correction function of the controller 30 according to the first embodiment. In the drawing, an example of a configuration of one track 41 is illustrated. The error correction function will be described based on the configuration of the track 41.

In the track 41, the servo sectors SV are arranged at intervals in the circumferential direction. Servo sector IDs are given to the servo sectors SV, respectively. The servo sector SV to which a servo sector ID of "X" is given is denoted as a servo sector SV #X. According to the example illustrated in FIG. 5, eight servo sectors SV are arranged in one track 41. Then, pieces of numerical information corresponding to positional orders with a circumferential position at which a write operation on the track 41 is started as a reference position are given as the servo sector IDs to the eight servo sectors SV, respectively.

In one track 41, a large number of data sectors DS are arranged. Data sector IDs are given to the data sectors DS, respectively, in the track 41. The data sector DS to which a data sector ID of "Y" is given is denoted as a data sector DS #Y. In the example illustrated in FIG. 5, seventeen data sectors DS are arranged in one track 41. Then, pieces of numerical information corresponding to positional orders along the track 41 from the reference position are given as the data sector IDs to the seventeen data sectors DS, respectively.

Hereinafter, a data piece scheduled to be written to the data sector DS #Y and a data piece that has been written in the data sector DS #Y will be denoted as data pieces #Y.

In the circumferential direction of the track 41, the head and the end are defined based on the reference position and the write/read direction.

Specifically, in a section from when the magnetic head 22 passes over the reference position to when the magnetic head 22 next passes over the reference position, a position where the magnetic head 22 initially passes over is denoted as a track head. Moreover, in the section from when the magnetic head 22 passes over the reference position to when the magnetic head 22 next passes over the reference position, a position where the magnetic head 22 lastly passes over is denoted as a track end. The data sector DS located at the track head, namely, a data sector DS #0 is denoted as the head data sector DS. The data sector DS located at the track end, namely, a data sector DS #16 is denoted as the end data sector DS.

A data piece to be written to each of the data sectors DS is subjected to error correction coding by the RWC 25. That is, the data piece stored in each of the data sectors DS includes an error correction code. The RWC 25 can perform error correction in units of the data sectors DS on a data piece read from one data sector DS using the error correction code. The error correction in units of the data sectors DS is denoted as sector error correction. Failure of the sector error correction is denoted as a sector read error. Note that failure of the error correction means that read data cannot be recovered to data equivalent to the original data by the error correction.

A scheme of error correction coding for the sector error correction is not limited to a specific scheme. In one example, a low-density parity-check code is applied as the scheme of error correction coding for the sector error correction.

The data sector DS #16, which is the end data sector DS, is a parity-dedicated data sector DS. Write on the track 41 is executed as follows. First, data pieces are written to the data sector DS #0 to a data sector DS #15 in numerical order of the data sectors. In the data sector DS #16, parity calculated based on a group of the data pieces written in the data sectors DS #0 to DS #15 is written.

The parity written to the data sector DS #16 protects the group of data pieces written in the data sectors DS #0 to DS #15 from occurrence of an error. Even if sector read errors occur in some data pieces among the data sectors DS #0 to DS #15, it is possible to recover the data pieces in which the sector read errors have occurred by error correction using the parity written in the data sector DS #16. That is, the parity written to the data sector DS #16 protects data in units of tracks. The parity written to the data sector DS #16 is denoted as track parity. The error correction using the track parity is denoted as track error correction.

A method of calculating the track parity is not limited to a specific method. In one example, the track parity is generated by executing XOR for each bit position on the group of data pieces written in the data sectors DS #0 to DS #15.

There is a correction limit in the track error correction. Therefore, the track error correction may fail. Failure of the track error correction is denoted as a track read error. When the track read error occurs, data recovery may eventually become impossible. Therefore, the controller 30 executes various types of control in the write operation in order to prevent the track read error. In a state where the track read error is estimated to occur, the controller 30 immediately ends the write operation on the write target track 41 and executes an operation for protecting the data of an adjacent track from being unrecoverable. The operation for protecting the data of the adjacent track from being unrecoverable is denoted as a protection operation.

As the protection operation, various operations can be executed. Two examples of the protection operation will be described hereinafter.

Figure 6:
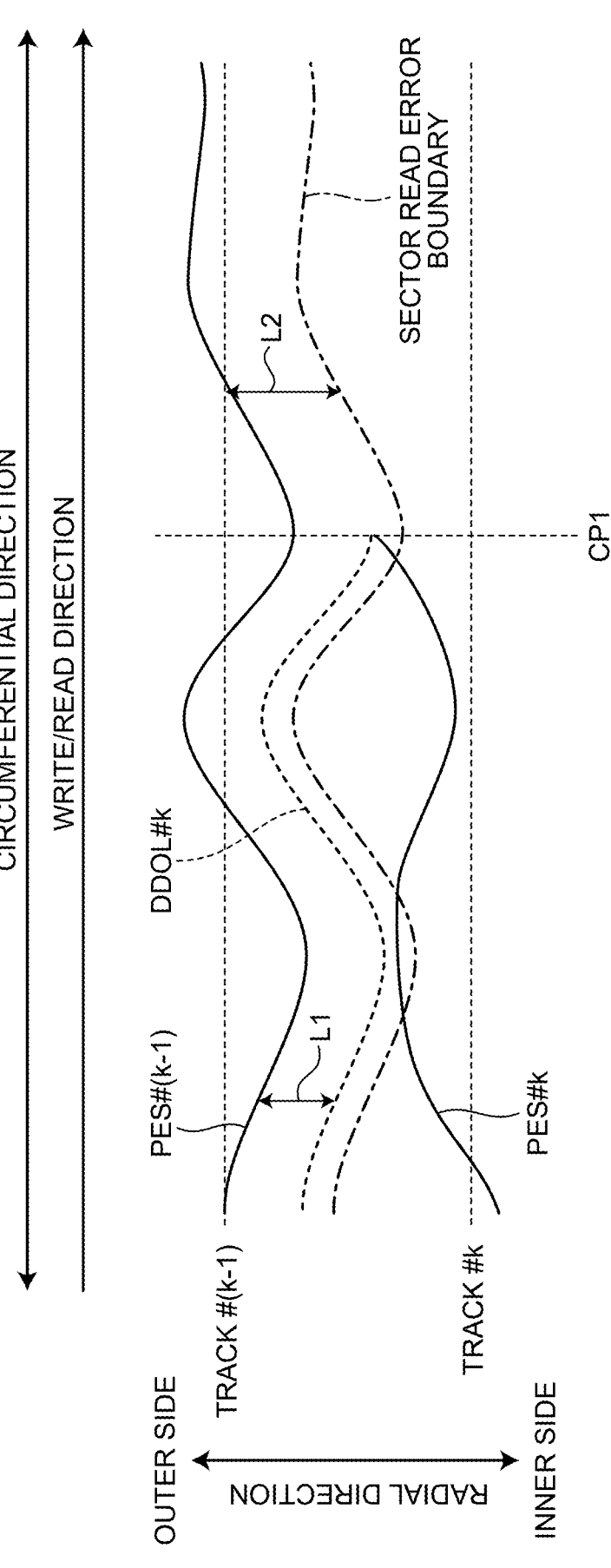
FIG. 6 is a view for describing an example of a protection operation according to the first embodiment.
Figure 7:
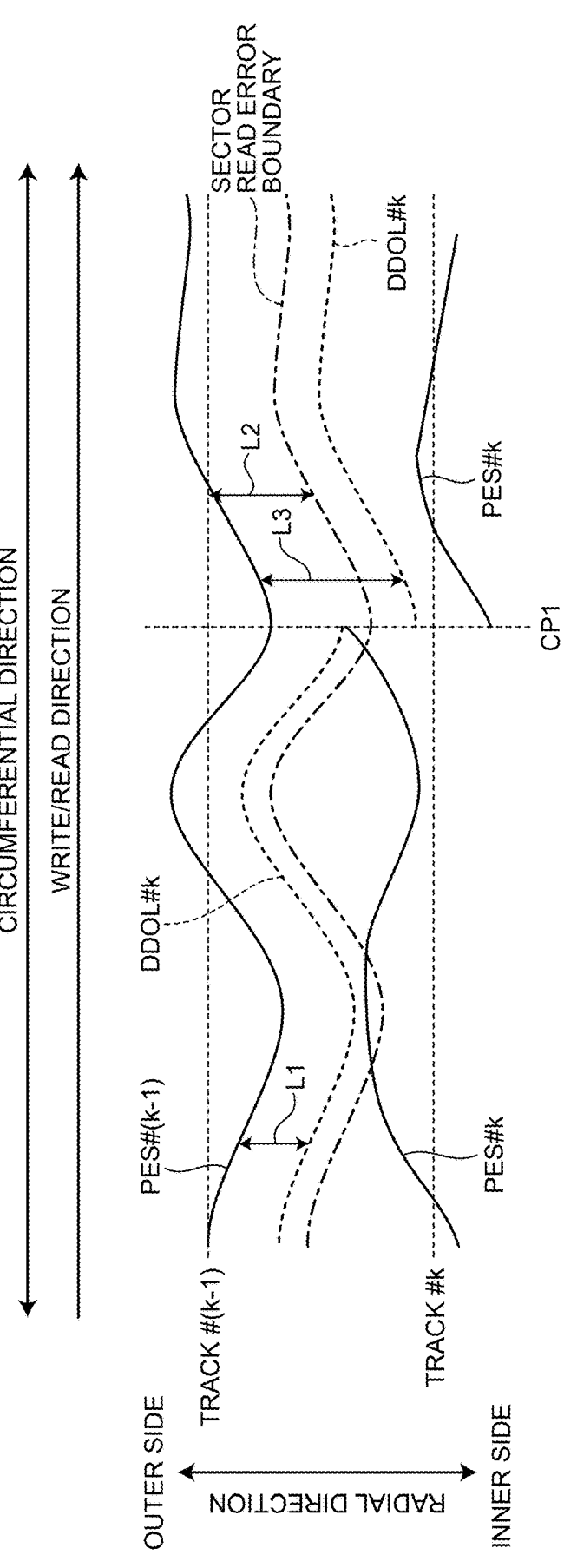
FIG. 7 is another view for describing an example of the protection operation according to the first embodiment.

FIGS. 6 and 7 are views for describing examples of the protection operation according to the first embodiment. Here, a protection operation in a write operation on a track #k will be described with reference to a track #(k−1) and the track #k in these drawings.

FIG. 6 illustrates a transition of a positional error signal PES #(k−1) in the write operation on the track #(k−1). The positional error signal PES #(k−1) indicates an actual trajectory of the magnetic head 22 at the time of the write operation on the track #(k−1). That is, the positional error signal PES #(k−1) indicates a write position of data of the track #(k−1) which is an adjacent track.

In an initial state, the controller 30 sets a dynamic drift-off level DDOL #k with the write position of the data of the track #(k−1), namely, the trajectory indicated by the positional error signal PES #(k−1) as a reference. Specifically, the controller 30 sets the dynamic drift-off level DDOL #k at a position offset from the trajectory indicated by the positional error signal PES #(k−1) toward the track #k by a predetermined fixed length L1.

The dynamic drift-off level is a boundary line of a write permission range determined based on the position of the data of the adjacent track.

The controller 30 sets a sector read error boundary with the trajectory indicated by the positional error signal PES #(k−1) as a reference. Specifically, the controller 30 sets the sector read error boundary at a position offset from the trajectory indicated by the positional error signal PES #(k−1) toward the track #k by L2 (where L2>L1).

The sector read error boundary is a boundary where it is considered that the sector read error does not occur in the adjacent track unless the magnetic head 22 exceeds the sector read error boundary toward the adjacent track during the write operation. That is, the sector read error boundary is a boundary line in the radial direction corresponding to a correction limit of the sector read error.

Whether the track read error occurs in the adjacent track can be estimated by comparing a cumulative damage evaluation amount CDE with a track read error threshold $Th_{CDE}$. The cumulative damage evaluation amount CDE is an amount obtained by accumulating a damage evaluation amount DE in a section in the circumferential direction in which the write operation is performed. The damage evaluation amount DE is an amount obtained by digitizing damage exceeding a level at which the sector read error occurs, the damage being received by the data piece of the data sector DS of the adjacent track by the squeeze write. In a case where the cumulative damage evaluation amount CDE is smaller than the track read error threshold $Th_{CDE}$, it is estimated that the track read error does not occur in the adjacent track. In a case where the cumulative damage evaluation amount CDE is larger than the track read error threshold $Th_{CDE}$, it is estimated that the track read error may occur in the adjacent track.

The damage evaluation amount DE is acquired as the sector read error boundary. In a case where the magnetic head 22 exceeds the sector read error boundary toward the adjacent track, a distance in the radial direction between the magnetic head 22 and the sector read error boundary is acquired as the damage evaluation amount DE. In a case where the magnetic head 22 does not exceed the sector read error boundary toward the adjacent track, the damage evaluation amount DE is set to zero.

Note that the sector read error boundary may be defined by the length L2 or may be defined by a threshold with respect to the squeeze amount SQ. Here, it is assumed that the sector read error boundary is defined by the threshold with respect to the squeeze amount SQ. Then, the threshold is denoted as a first squeeze amount threshold $Th_{SQ1}$. Note that a relationship between the first squeeze amount threshold $Th_{SQ1}$ and the length L2 is represented by Formula (1) described below. In the formula, TP is a design value of a track pitch and also a design value of a track width.

$$Th_{SQ1} = TP - L2 \tag{1}$$

The controller 30 acquires, as the damage evaluation amount DE, an excess amount of the squeeze amount SQ over the first squeeze amount threshold $Th_{SQ1}$. The damage evaluation amount DE thus represents part of the squeeze amount SQ that excesses the first squeeze amount threshold $Th_{SQ1}$. In a case where the first squeeze amount SQ does not exceed the squeeze amount threshold $Th_{SQ1}$, the controller 30 determines that the damage evaluation amount DE is zero. In a case where the squeeze amount SQ exceeds the first squeeze amount threshold $Th_{SQ1}$, the controller 30 acquires a value as the damage evaluation amount DE by subtracting the first squeeze amount threshold $Th_{SQ1}$ from the squeeze amount SQ.

In a case where the magnetic head 22 exceeds the dynamic drift-off level DDOL toward the adjacent track during the write operation, or in a case where it is estimated that the track read error may occur in the adjacent track, the write operation is interrupted and the protection operation is executed.

In the example illustrated in FIG. 6, in the midst of the write operation on the track #k, the magnetic head 22 exceeds the dynamic drift-off level DDOL toward the adjacent track at a circumferential position CP1. Therefore, the controller 30 interrupts the write operation at the circumferential position CP1 and executes the protection operation.

In the examples illustrated in FIGS. 6 and 7, the controller 30 tighten the write permission range (specifically, the dynamic drift-off level DDOL #k) as the protection operation. The controller 30 moves the dynamic drift-off level DDOL #k between the circumferential position CP1 and the track end toward the track #k.

FIG. 7 illustrates an operation when the dynamic drift-off level DDOL #k is tightened. The controller 30 sets the dynamic drift-off level DDOL #k after the circumferential position CP1 to a position offset toward the track #k by a fixed length L3 from the trajectory indicated by the positional error signal PES #(k−1). L3 is longer than L2. As a result, in a part after the circumferential position CP1, the sector read error does not occur in the data sector DS of the adjacent track, and the data of the adjacent track is prevented from being eventually unrecoverable.

Note that the controller 30 interrupts the write operation and tightens the dynamic drift-off level DDOL #k when the magnetic head 22 passes over the circumferential position CP1 in the example illustrated in FIG. 7. Then, when the magnetic disk 11 makes one rotation and the magnetic head 22 approaches the circumferential position CP1 again, the controller 30 determines whether a position of the magnetic head 22 exceeds the tightened dynamic drift-off level DDOL #k. Since the position of the magnetic head 22 does not exceed the tightened dynamic drift-off level DDOL #k, the controller 30 resumes the write operation from the circumferential position CP1.

Figure 8:
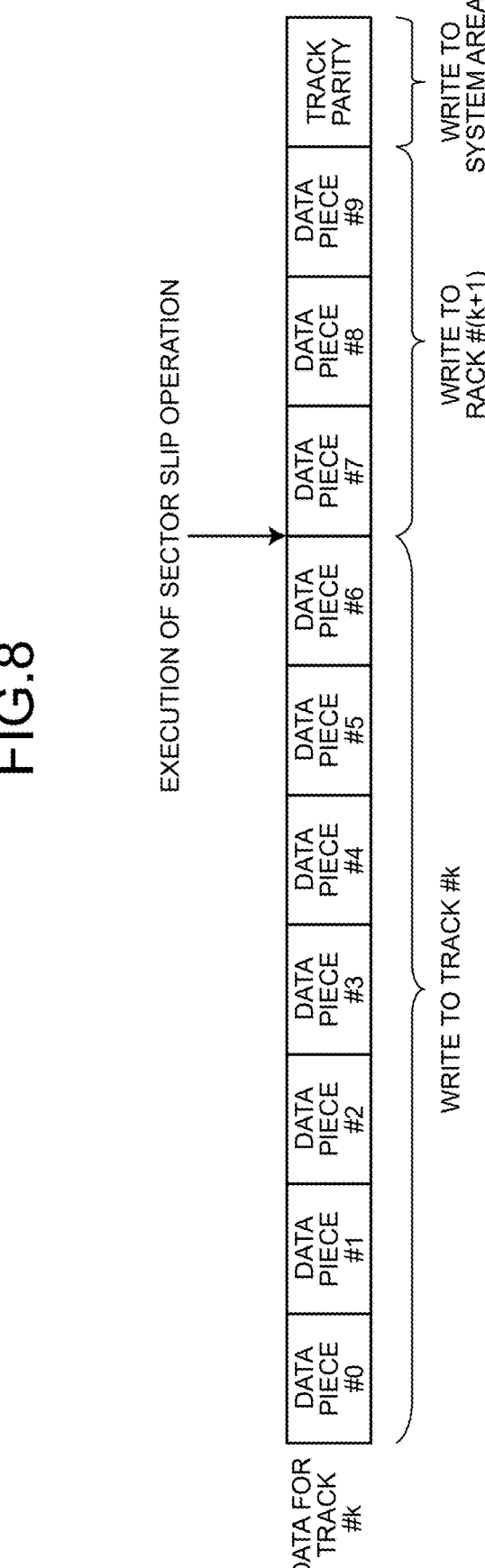
FIG. 8 is a view for describing another example of the protection operation according to the first embodiment.

FIG. 8 is a view for describing another example of the protection operation according to the first embodiment. In the drawing, data pieces #0 to #9 and track parity are illustrated as an example of data corresponding to one track written to the track #k. The data corresponding to one track is denoted as data for the track #k. In the example illustrated in the drawing, a sector slip operation is executed as the protection operation.

It is assumed that a condition for starting the protection operation is satisfied at the timing when write from the data piece #0 to the data piece #6 out of the data for the track #k is completed. At that time, the controller 30 ends the write operation on the track #k and executes the sector slip operation that is the protection operation.

In the sector slip operation, the controller 30 writes, to a track #(k+1), the data pieces #7 to #9 which are data pieces not yet written to the track #k out of the data for the track #k. For example, the controller 30 writes the data pieces #7 to #9 in data sectors #0 to #2 of the track #(k+1). In addition, the track parity of the data for the track #k is written to a system area (not illustrated). The system area is provided at a position different from the band region 130 where the user data is written. The system area may be provided in the magnetic disk 11 or may be provided in a nonvolatile memory such as the FROM 28.

As the sector slip operation is executed, write of a part of the track #k in a range from a circumferential position where the write operation is ended to the end of this track is stopped. This prevents the track read error from occurring in the adjacent track.

Note that, in the sector slip operation executed in the track #k, the controller 30 may write the track parity to a parity sector of the track #k instead of the system area. That is, in the sector slip operation, the controller 30 refrains from writing data in a section between a circumferential position where the write operation is interrupted and a predetermined circumferential position. The predetermined circumferential position is a circumferential position immediately before the parity sector or the track end.

Here, a technique to be compared with the first embodiment will be described. The technique to be compared with the first embodiment will be denoted as a comparative example.

Although a large number of the data sectors DS are provided in the magnetic disk 11, these data sectors DS usually vary in quality. There are various causes of the variation in the quality of the data sectors DS such as non-uniformity of the recording surface 100 and non-uniformity of quality of the servo sectors SV. According to the comparative example, the first squeeze amount threshold $Th_{SQ1}$ is determined based on the data sector DS having the lowest quality, and the first squeeze amount threshold $Th_{SQ1}$ is common in one track.

According to the comparative example, it is possible to prevent a track read error from occurring in an adjacent track. However, the first squeeze amount threshold $Th_{SQ1}$ is a common value among all the data sectors DS in the track determined based on the poor data sector DS having low quality. Therefore, in consideration of the variation in the quality of the data sectors DS in the track 41, the cumulative damage evaluation amount CDE obtained according to the comparative example can be considered as one excessively evaluating damage received by data of the adjacent track. That is, there is room for reducing the frequency of execution of a protection operation.

In the first embodiment, the controller 30 changes the first squeeze amount threshold $Th_{SQ1}$ in the track 41 according to the quality of each of the data sectors DS of the adjacent track. As a result, the controller 30 can acquire, as the cumulative damage evaluation amount CDE, a value that more appropriately represents the damage received by the data of the adjacent track as compared with the comparative example. Since the cumulative damage evaluation amount CDE acquired in this manner is used, the frequency at which the track read error is estimated to occur in the adjacent track is reduced, and the frequency of execution of the protection operation is reduced.

As an index indicating the quality of the data sector DS of the adjacent track, a bit error rate at the time of reading a data piece stored in the data sector DS is used. The bit error rate is a ratio of the number of bits changed by an error to the number of all bits included in the read data piece. The lower the bit error rate, the higher the quality. Hereinafter, the bit error rate at the time of reading the data piece stored in the data sector DS is simply denoted as a bit error rate of the data sector DS.

An example of an operation of setting the first squeeze amount threshold $Th_{SQ1}$ based on the bit error rate of the data sector DS will be described with reference to FIGS. 9 and 10.

Figure 9:
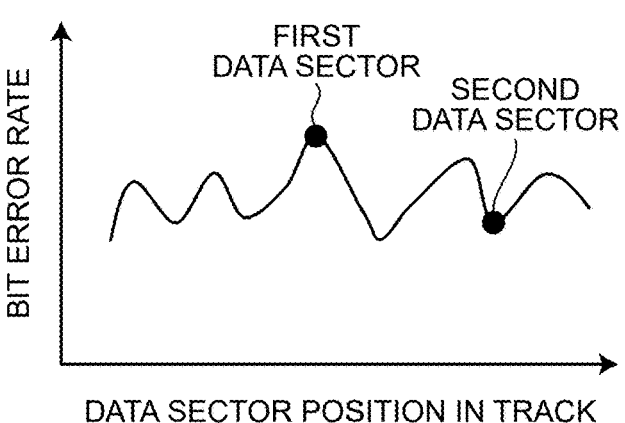
FIG. 9 is a view illustrating an example of a bit error rate of each data sector included in a track that is an adjacent track during a write operation according to the first embodiment.

FIG. 9 is a view illustrating an example of a bit error rate of each of the data sectors DS included in the track 41 which is an adjacent track during a write operation according to the first embodiment. In the drawing, the horizontal axis represents a position of each of the data sectors DS in the track 41 which is the adjacent track. The vertical axis represents the bit error rate.

It can be read from FIG. 9 that the bit error rates of the data sectors DS vary in the track 41. For example, a bit error rate of a first data sector is the maximum in the track 41. That is, the first data sector has the lowest quality in the track 41. In addition, for example, a bit error rate of a second data sector is the minimum in the track 41. That is, the second data sector has the highest quality in the track 41.

The controller 30 sets the first squeeze amount threshold $Th_{SQ1}$ based on the bit error rate of each of the data sectors DS in the adjacent track and the following Formulas (2) and (3). $Th_{SQbase}$ is a value as large as possible in a numerical range in which it is guaranteed that a data unit set without an error can be acquired by sector error correction from the data sector DS having the largest bit error rate in the adjacent track. $Mar_{base}$ is set in the manufacturing process.

$$Th_{SQbase} = TP - Mar_{base} \tag{2}$$

$$Th_{SQ1} = Th_{SQbase} + Mar1 \tag{3}$$

In Formula (3), Mar1 is a relaxation amount determined according to the bit error rate of the data sector DS. The controller 30 calculates the threshold relaxation amount Mar1 for each of the data sectors DS of the adjacent track based on correspondence information 281 set in advance.

Figure 10:
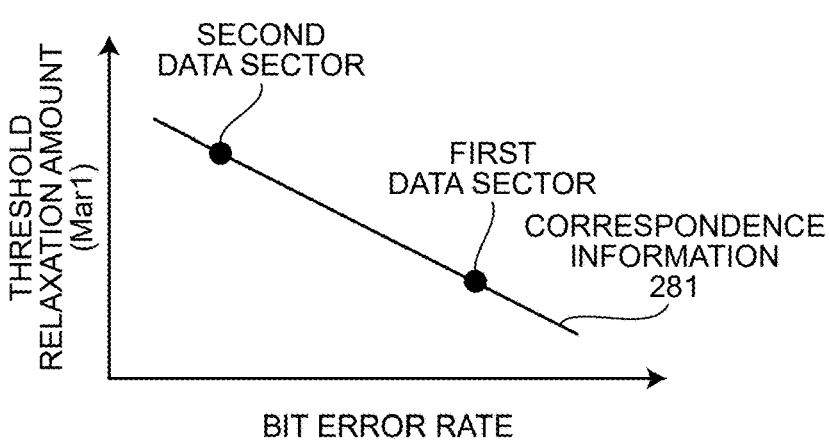
FIG. 10 is a view illustrating an example of correspondence information according to the first embodiment.

FIG. 10 is a view illustrating an example of the correspondence information 281 according to the first embodiment. In the drawing, the horizontal axis represents the bit error rate of the data sector DS of the adjacent track, and the vertical axis represents the threshold relaxation amount Mar1.

As illustrated in FIG. 10, according to the correspondence information 281, a relationship between the bit error rate and the threshold relaxation amount Mar1 is defined such that the threshold relaxation amount Mar1 increases as the bit error rate decreases. Therefore, for example, the threshold relaxation amount Mar1 at a circumferential position of the second data sector DS is larger than the threshold relaxation amount Mar1 at a circumferential position of the first data sector DS. According to the correspondence information 281, the first squeeze amount threshold $Th_{SQ1}$ increases as the quality of the data sector DS of the adjacent track increases. Therefore, even if the squeeze amount SQ is the same value, it is possible to estimate the damage evaluation amount DE indicating the damage received by the data of the data sector DS of the adjacent track having high quality to be smaller than the damage evaluation amount DE indicating the damage to the data of the data sector DS of the adjacent track having low quality.

Note that, in a case where a third data sector DS and a fourth data sector DS having a larger bit error rate than the third data sector DS are included, as long as the threshold relaxation amount Mar1 for the fourth data sector DS is smaller than the threshold relaxation amount Mar1 for the third data sector DS, the relationship between the bit error rate and the threshold relaxation amount Mar1 defined by the correspondence information 281 is not limited to the example illustrated in FIG. 10. In the example illustrated in FIG. 10, the threshold relaxation amount Mar1 is represented by a linear function of the bit error rate. The relationship between the threshold relaxation amount Mar1 and the bit error rate is not limited to the relationship represented by the linear function. For example, the threshold relaxation amount Mar1 may change stepwise according to the bit error rate. The threshold relaxation amount Mar1 may be expressed by a polynomial of a second or higher order of the bit error rate. An upper limit or a lower limit may be provided in the threshold relaxation amount Mar1.

The correspondence information 281 is stored in advance in a predetermined nonvolatile storage area in the magnetic disk apparatus 1. In addition, the bit error rate of each of the data sectors DS provided in the magnetic disk 11 is measured in the manufacturing process, and is stored in advance in the predetermined nonvolatile storage area in the magnetic disk apparatus 1. For example, the manufacturing process includes an inspection process of inspecting the presence or absence of a defect occurring in the magnetic disk 11 by writing data to all the tracks 41 and then reading data from all the tracks 41. When data is read from all the tracks 41 in the inspection process, the bit error rate is measured for each of the data sectors DS, and a measured value of the bit error rate for each of the data sectors DS is recorded in measured BER information 282 to be described later.

Figure 11:
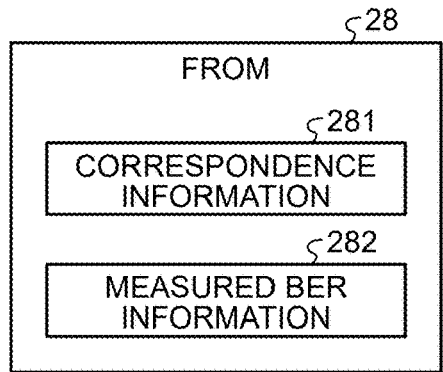
FIG. 11 is a view illustrating an example of information stored in a FROM according to the first embodiment.

FIG. 11 is a view illustrating an example of information stored in the FROM 28 according to the first embodiment. In the example illustrated in this drawing, the correspondence information 281 and the measured BER information 282 are stored in the FROM 28. The measured BER information 282 is information in which the measured value of the bit error rate of each of the data sectors DS provided in the magnetic disk 11 is recorded. Note that the nonvolatile storage area in which the correspondence information 281 is stored is not limited to the FROM 28. The nonvolatile storage area in which the measured BER information 282 is stored is not limited to the FROM 28.

Note that the controller 30 can acquire the PES every time the magnetic head 22 passes over the servo sector SV. However, as can be seen from FIG. 5, the number of data sectors present between the servo sectors SV is not necessarily one. Therefore, the controller 30 calculates the squeeze amount SQ and the damage evaluation amount DE at the circumferential position of each of the data sectors DS of the adjacent track based on the PES in each servo sector. A specific example of a method of calculating the squeeze amount SQ and the damage evaluation amount DE at the circumferential position of each of the data sectors DS of the adjacent track will be described later.

Alternatively, the controller 30 may simply calculate the squeeze amount SQ and the damage evaluation amount DE for each circumferential position of the servo sector SV. The controller 30 may acquire the cumulative damage evaluation amount CDE by accumulating the damage evaluation amount DE calculated for each circumferential position of the servo sector SV.

Similarly, the controller 30 may change the first squeeze amount threshold $Th_{SQ1}$ for each of the data sectors DS of the adjacent track or may change the first squeeze amount threshold $Th_{SQ1}$ for each of the servo sectors SV in the write operation on the write target track 41. In a case where the first squeeze amount threshold $Th_{SQ1}$ is changed for each of the servo sectors SV, the controller 30 converts the first squeeze amount threshold $Th_{SQ1}$ calculated for each of the data sectors DS of the adjacent track into the first squeeze amount threshold $Th_{SQ1}$ for each of the servo sectors SV. A specific example of a method of converting the first squeeze amount threshold $Th_{SQ1}$ will be described later.

Figure 12:
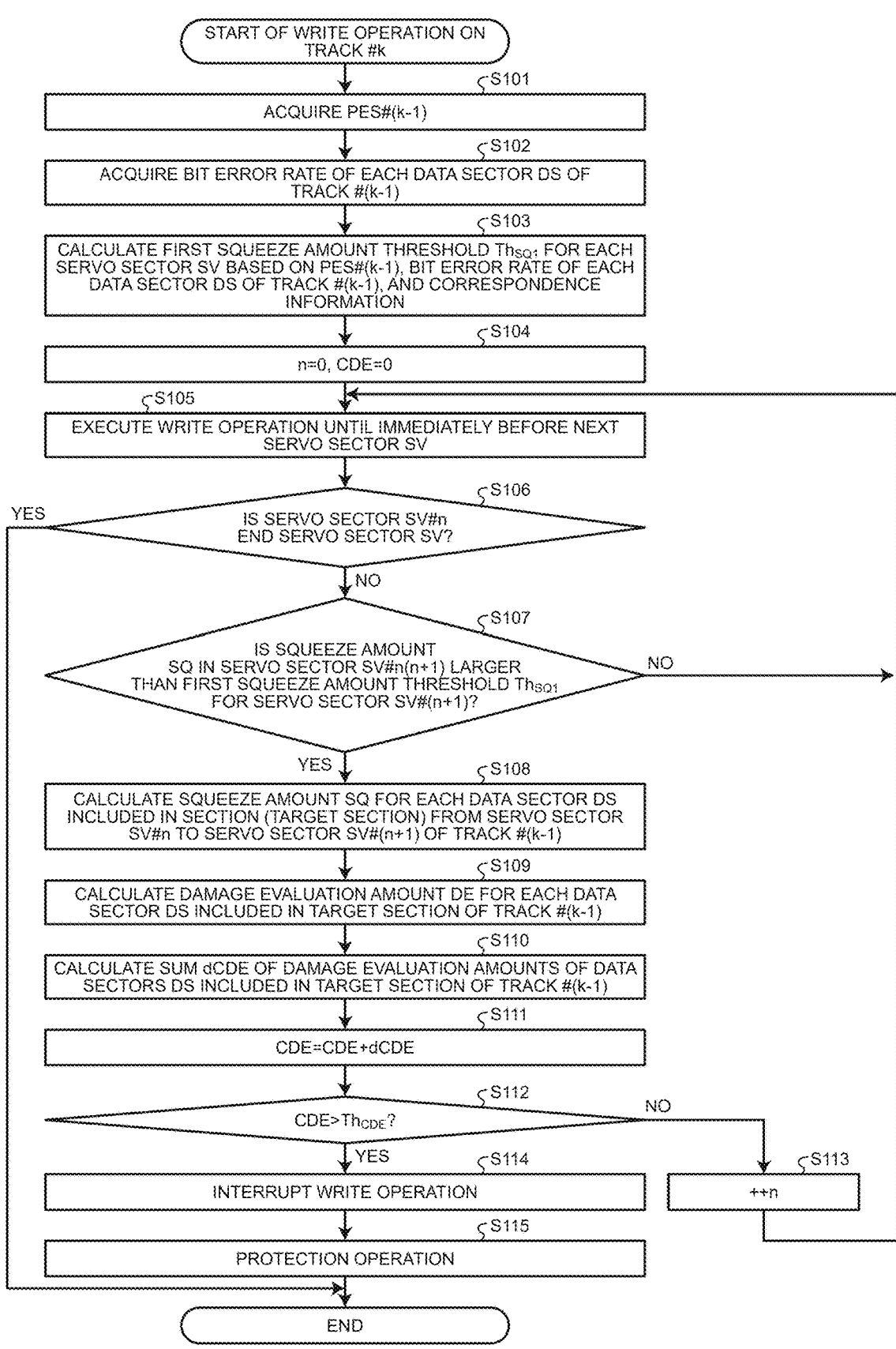
FIG. 12 is a flowchart illustrating an example of an operation of the magnetic disk apparatus according to the first embodiment.

FIG. 12 is a flowchart illustrating an example of an operation of the magnetic disk apparatus 1 according to the first embodiment. The drawing illustrates a series of processing of the write operation on the track #k.

Note that the controller 30 is assumed to calculate the squeeze amount SQ and the damage evaluation amount DE for each data sector SS of the adjacent track in the example illustrated in FIG. 12. In addition, the controller 30 changes the first squeeze amount threshold $Th_{SQ1}$ for each of the servo sectors SV.

First, the controller 30 acquires the positional error signal PES #(k−1) of the adjacent track, namely, the track #(k−1) (S101).

A method of acquiring the positional error signal PES #(k−1) is not limited to a specific method. For example, when the write operation has been performed on the track #(k−1), the controller 30 stores the positional error signal PES #(k−1) for one cycle of the track #(k−1) in a predetermined storage area. Then, in S101, the controller 30 acquires the positional error signal PES #(k−1) for one cycle of the track #(k−1) stored in the predetermined storage area.

The controller 30 refers to the measured BER information 282 to acquire the bit error rate of each of the data sectors DS of the track #(k−1) (S102).

The controller 30 calculates the first squeeze amount threshold $Th_{SQ1}$ for each of the servo sectors SV based on the positional error signal PES #(k−1), the bit error rate of each of the data sectors DS of the track #(k−1), and the correspondence information 281 (S103). In S103, the controller 30 calculates the first squeeze amount threshold $Th_{SQ1}$ for each of the data sectors DS of the adjacent track by using the above-described Formulas (2) and (3). Then, the controller 30 converts the first squeeze amount threshold $Th_{SQ1}$ calculated for each of the data sectors DS of the adjacent track into the first squeeze amount threshold $Th_{SQ1}$ for each of the servo sectors SV.

The controller 30 selects a certain servo sector SV as the target servo sector SV. The controller 30 sets a minimum value of the first squeeze amount threshold $Th_{SQ1}$ among all the data sectors DS of the adjacent track at least partly included in a section between the servo sector SV where the magnetic head 22 passes over immediately before the target servo sector SV and the servo sector SV where the magnetic head 22 passes over immediately after the target servo sector SV as the first squeeze amount threshold $Th_{SQ1}$ for the target servo sector SV. The controller 30 sequentially selects each of the servo sectors SV as the target servo sector SV to calculate the first squeeze amount threshold $Th_{SQ1}$ at the circumferential position of each of the servo sectors SV. Note that the method of converting the first squeeze amount threshold $Th_{SQ1}$ is not limited to this method.

Note that the method of converting the first squeeze amount threshold $Th_{SQ1}$ is not limited to this method. The controller 30 may set the minimum value, an average value, or a median of the first squeeze amount thresholds $Th_{SQ1}$ of all the data sectors DS of the adjacent track included in a section of a predetermined length including the target servo sector SV as the first squeeze amount threshold $Th_{SQ1}$ at a circumferential position of the target servo sector SV.

Note that, when the circumferential positions of the servo sectors SV are expressed as first positions and the circumferential positions of the data sectors DS of the adjacent track are expressed as second positions, the processing of S103 can be considered as calculation processing performed individually for each of the first positions based on the quality of each of one or more second positions corresponding to each of the first positions among the multiple second positions in the circumferential direction.

Following the processing of S103, the controller 30 initializes a variable n and a variable CDE to zero (S104). The variable n is a variable in which an ID of the servo sector SV is stored. The variable CDE is a variable in which a calculated value of the cumulative damage evaluation amount CDE is stored.

The controller 30 executes the write operation on a section from immediately after a servo sector SV #n to immediately before the servo sector SV next to the servo sector SV #n (S105). At this time, the controller 30 reads the servo information from the servo sector SV subsequent to the servo sector SV #n and acquires the PES based on the read servo information.

The controller 30 determines whether the servo sector SV #n is the end servo sector SV (S106). According to the configuration of the track 41 illustrated in FIG. 5, the servo sector SV #7 is the end servo sector SV.

In a case where the servo sector SV #n is the end servo sector SV (S106: Yes), the write operation on the track #k is completed.

In a case where the servo sector SV #n is not the end servo sector SV (S106: No), the controller 30 determines whether the squeeze amount SQ in a servo sector SV #(n+1) is larger than the first squeeze amount threshold $\text{Th}_{SQ1}$ for the servo sector SV #(n+1) (S107).

In S107, the controller 30 calculates a difference between the positional error signal PES #(k−1) in the servo sector SV #n and a positional error signal PES #k in the servo sector SV #n to acquire the squeeze amount SQ in the servo sector SV #(n+1).

In a case where the squeeze amount SQ in the servo sector SV #(n+1) is not larger than the first squeeze amount threshold $\text{Th}_{SQ1}$ for the servo sector SV #(n+1) (S107: No), the control transitions to S105.

In a case where the squeeze amount SQ in the servo sector SV #(n+1) is larger than the first squeeze amount threshold $\text{Th}_{SQ1}$ for the servo sector SV #(n+1) (S107: Yes), the controller 30 calculates the squeeze amount SQ for each of the data sectors DS included in a section between the servo sector SV #n and the servo sector SV #(n+1) of the track #(k−1) (S108). The section between the servo sector SV #n and the servo sector SV #(n+1) is denoted as a first section.

As described above, the positional error signal PES is acquired every time the magnetic head 22 passes over the servo sector SV. Therefore, the squeeze amount SQ in each of the servo sectors SV can be directly calculated based on the positional error signal PES. The controller 30 estimates the squeeze amount SQ for each of the data sectors DS of the adjacent track based on the squeeze amount SQ in each of the servo sectors SV.

In one example, the controller 30 calculates the squeeze amount SQ for each of the data sectors DS of the adjacent track by interpolating the squeeze amount SQ in each of the servo sectors SV. A positional relationship between each of the servo sectors SV and each of the data sectors DS of the adjacent track is known. The controller 30 calculates the squeeze amount SQ for each of the data sectors DS of the adjacent track by linear interpolation of the squeeze amount SQ in each of the servo sectors SV using this positional relationship. That is, in S108, the controller 30 acquires the squeeze amount SQ for each of the data sectors DS included in the first section by linear interpolation of the squeeze amount SQ in the servo sector SV #n and the squeeze amount SQ in the servo sector SV #(n+1). The interpolation method is not limited to the linear interpolation. The controller 30 may perform complementation by approximation with a polynomial of a second or higher order.

In another example, the controller 30 regards that the squeeze amount SQ of all the data sectors DS between two servo sectors SV adjacent in the circumferential direction are equal to a larger value of the squeeze amounts SQ in the two servo sectors SV. That is, in S108, the controller 30 regards the larger value out of the squeeze amount SQ in the servo sector SV #n and the squeeze amount SQ in the servo sector SV #(n+1) as the squeeze amount SQ of all the data sectors DS included in the first section of the track #(k−1).

Note that the method of calculating the squeeze amount SQ for each of the data sectors DS of the adjacent track is not limited to the above-described method.

Subsequent to S108, the controller 30 calculates the damage evaluation amount DE for each of the data sectors DS included in the first section of the track #(k−1) (S109).

In S109, the controller 30 performs the following processing for each of the data sectors DS included in the first section of the track #(k−1). That is, the controller 30 first subtracts the first squeeze amount threshold $\text{Th}_{SQ1}$ for the servo sector SV #(n+1) from the squeeze amount SQ. When a value $(SQ-\text{Th}_{SQ1})$ is zero or smaller, the controller 30 determines that the damage evaluation amount DE is zero. When the value $(SQ-\text{Th}_{SQ1})$ is larger than zero, the controller 30 sets the value $(SQ-\text{Th}_{SQ1})$ as the damage evaluation amount DE.

The controller 30 calculates a sum (denoted as dCDE) of the damage evaluation amounts DE of the data sectors DS included in the first section of the track #(k−1) (S110). Then, the controller 30 adds dCDE to a value of the variable CDE and updates the value of the variable CDE with a value obtained by the addition (S111).

The variable CDE indicates the cumulative damage evaluation amount CDE. The controller 30 determines whether the value of the variable CDE, namely, the cumulative damage evaluation amount CDE is larger than the track read error threshold $\text{Th}_{CDE}$ (S112).

When the value of the variable CDE is not larger than the track read error threshold $\text{Th}_{CDE}$ (S112: No), the controller 30 increments a value of the variable n by one (S113), and the control transitions to S105.

When the value of the variable CDE is larger than the track read error threshold $\text{Th}_{CDE}$ (S112: Yes), the controller 30 interrupts the write operation on the track #k (S114). Then, the controller 30 executes the protection operation (S115), and a series of operations ends.

As the protection operation, the controller 30 may tighten the dynamic drift-off level DDOL #k or may execute the sector slip operation. In a case where the tightening of the dynamic drift-off level DDOL #k is performed as the protection operation, when the magnetic head 22 approaches an interruption position by one rotation of the magnetic disk 11 after the interruption of the write operation, the controller 30 resumes the write operation.

Note that, in the series of operations illustrated in FIG. 12, the processing of S113 is executed when the cumulative damage evaluation amount CDE is equal to the track read error threshold $\text{Th}_{CDE}$ in the determination processing of S112. The processing of S114 may be executed when the cumulative damage evaluation amount CDE is equal to the track read error threshold $\text{Th}_{CDE}$ in the determination processing of S112.

The processing of S107 to S111 in the series of operations illustrated in FIG. 12 is an example of a first operation. In addition, the first squeeze amount threshold $\text{Th}_{SQ1}$ is an example of a first threshold. The track read error threshold $\text{Th}_{CDE}$ is an example of a second threshold. The cumulative damage evaluation amount CDE is an example of a first amount.

In this manner, according to the first embodiment, the controller 30 individually calculates the first squeeze amount threshold $\text{Th}_{SQ1}$ for each of the servo sectors SV at the first positions based on the quality of one or more data sectors DS of the adjacent track at one or more second positions corresponding to each of the first positions. In the write operation, when the magnetic head 22 passes over the servo sector SV, the controller 30 calculates the cumulative damage evaluation amount CDE that is the first amount obtained by accumulating the damage evaluation amounts DE each being an excess amount of the squeeze amount over the first squeeze amount threshold $\text{Th}_{SQ1}$ for all the data sectors DS included in a range adjacent to a part in the circumferential direction in which write has been completed. Then, the controller 30 compares the cumulative damage evaluation amount CDE with the track read error threshold $\text{Th}_{CDE}$, and executes the interruption of the write operation and the protection operation of protecting data of a second track based on a comparison result between the cumulative damage evaluation amount CDE and the track read error threshold $Th_{CDE}$.

Therefore, the frequency of execution of the protection operation is reduced. When the protection operation is executed, the time required to complete the write operation increases. By reducing the frequency of execution of the protection operation, an increase in the time required for the write operation is suppressed. That is, performance is improved.

According to the first embodiment, since the frequency of execution of the protection operation is reduced, there is room for further reducing the design value of the track width (or track pitch). By reducing the design value of the track width (or track pitch), the storage capacity of the magnetic disk apparatus 1 can be increased.

In addition, with the method of converting the first squeeze amount threshold $Th_{SQ1}$ according to the first embodiment exemplified in the description of the processing of S103, the first squeeze amount threshold $Th_{SQ1}$ for the servo sector SV having high quality of one or more data sectors DS of the adjacent track is larger than the first squeeze amount threshold $Th_{SQ1}$ for the servo sector SV having low quality of one or more data sectors DS of the adjacent track.

Therefore, the controller 30 can appropriately evaluate the damage received by the data of the adjacent track, and the frequency of execution of the protection operation is reduced.

In addition, according to the first embodiment, the controller 30 executes the interruption of the write operation and the protection operation when the cumulative damage evaluation amount CDE is larger than the track read error threshold $Th_{CDE}$. The controller 30 continues the write operation when the cumulative damage evaluation amount CDE is smaller than the track read error threshold $Th_{CDE}$.

Therefore, it is possible to prevent the data of the adjacent track from being unrecoverable by the squeeze write.

In addition, the first positions constitute a group of the circumferential positions of the respective servo sectors SV in the above description. That is, the first squeeze amount threshold $Th_{SQ1}$ for each of the servo sectors SV is calculated. The first positions do not necessarily constitute a group of the circumferential positions of the respective servo sectors SV.

For example, the first positions may constitute a group of the circumferential positions of the respective data sectors DS of the adjacent track. In this case, the controller 30 may calculate the first squeeze amount threshold $Th_{SQ1}$ for each of the data sectors DS of the adjacent track to be used for the calculation of the damage evaluation amount DE.

Note that the second positions constitute a group of the circumferential positions of the respective data sectors DS of the adjacent track according to the first embodiment. When one servo sector SV is regarded as the target servo sector SV, the controller 30 calculates the first squeeze amount threshold $Th_{SQ1}$ for the target servo sector SV based on the first squeeze amount thresholds $Th_{SQ1}$ of all the data sectors DS of the adjacent track at least partly included in the section between the servo sector SV where the magnetic head 22 passes over immediately before the target servo sector SV and the servo sector SV where the magnetic head 22 passes over immediately after the target servo sector SV as the first squeeze amount threshold $Th_{SQ1}$ for the target servo sector SV.

In addition, the cumulative damage evaluation amount CDE is a value corresponding to the correction limit of the error correction in units of the tracks 41 according to the first embodiment.

Therefore, it is possible to prevent the data of the adjacent track from being unrecoverable by the squeeze write.

In addition, according to the first embodiment, the controller 30 tightens the write permission range in the radial direction in the protection operation, and resumes the write operation after the tightening of the write permission range.

Alternatively, in the protection operation, the controller 30 refrains from writing data to the section between the circumferential position where the write operation is interrupted and the predetermined circumferential position according to the first embodiment.

In addition, the controller 30 uses the bit error rate as the index of the quality according to the first embodiment. The index of the quality is not limited to the bit error rate.

Second Embodiment

As a method of arranging data on a magnetic disk, there is known a configuration in which data is written to a region longer than a length corresponding to a size of a unit to be transmitted to and received from a host. Such a region is denoted as a long-distance sector. The long-distance sector has a length over a plurality of servo sectors in the circumferential direction.

In the second embodiment, a technique of changing a threshold of a determination criterion of a protection operation according to quality of a long-distance sector in a magnetic disk apparatus having a configuration in which long-distance sectors are provided in each track will be described. Note that matters different from those of the first embodiment will be described in the second embodiment. The same matters as those in the first embodiment will be briefly described or omitted.

Figure 13:
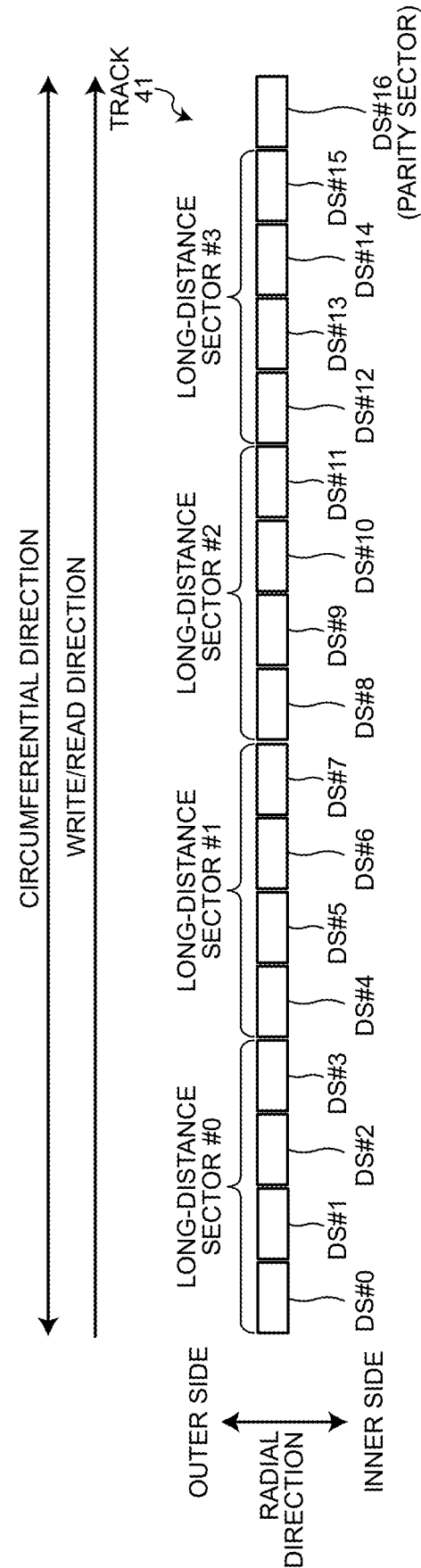
FIG. 13 is a view for describing an example of a configuration of a long-distance sector according to the first embodiment.

FIG. 13 is a view for describing an example of a configuration of a long-distance sector according to the first embodiment. Note that the servo sector SV is not illustrated in the drawing.

In one track 41, a large number of data sectors DS are arranged. In the example illustrated in FIG. 4, sixteen data sectors DS are arranged in one track 41. Each of the data sectors DS has a capacity corresponding to a unit size of data transferred between the host 2 and the magnetic disk apparatus 1.

For example, when the host 2 corresponds to a 4K sector, data is transferred between the host 2 and the magnetic disk apparatus 1 in units of 4K bytes. In such a case, each of the data sectors DS has a capacity corresponding to 4K bytes. More specifically, the controller 30 performs predetermined data processing such as error correction coding for sector error correction on a data unit of 4K bytes from the host 2, and writes the data unit after the predetermined data processing to the magnetic disk 11. By the predetermined data processing, a size of the data unit becomes larger than 4K bytes. Each of the data sectors DS has a capacity capable of storing a data unit having a size larger than 4K bytes by the predetermined data processing.

One long-distance sector includes a plurality of data sectors DS continuously arranged along the track 41. Then, numerical information corresponding to the positional order along the track 41 is given as an ID to each long-distance sector, which is similarly to the data sector DS.

In the example illustrated in FIG. 13, four data sectors DS constitute one long-distance sector. That is, data sectors DS

0 to DS #3 constitute a long-distance sector #0, data sectors DS #4 to DS #7 constitute a long-distance sector #1, data sectors DS #8 to DS #11 constitute a long-distance sector #2, and data sectors DS #12 to DS #15 constitute a long-distance sector #3.

A remaining data sector #16 is set as a sector in which track parity is written, namely, a parity sector. Note that the track parity may be included in the last long-distance sector (the long-distance sector #3 in the example illustrated in FIG. 13).

As in the first embodiment, a method of calculating the track parity is not limited to a specific method. In one example, the parity is generated by executing XOR for each bit position on a group of data units to be written to the data sectors DS #0 to DS #15. Note that, in a case where an interleave operation to be described later is executed, the track parity is calculated before the interleave operation.

In the second embodiment, data written to one data sector DS or the data before error correction coding for sector error correction is denoted as the data unit. In addition, a set including four data units to be written to a long-distance sector is denoted as a data unit set.

In the second embodiment, the controller 30 is further configured to be capable of performing the interleave operation and a de-interleave operation on the data unit set.

Figure 14:
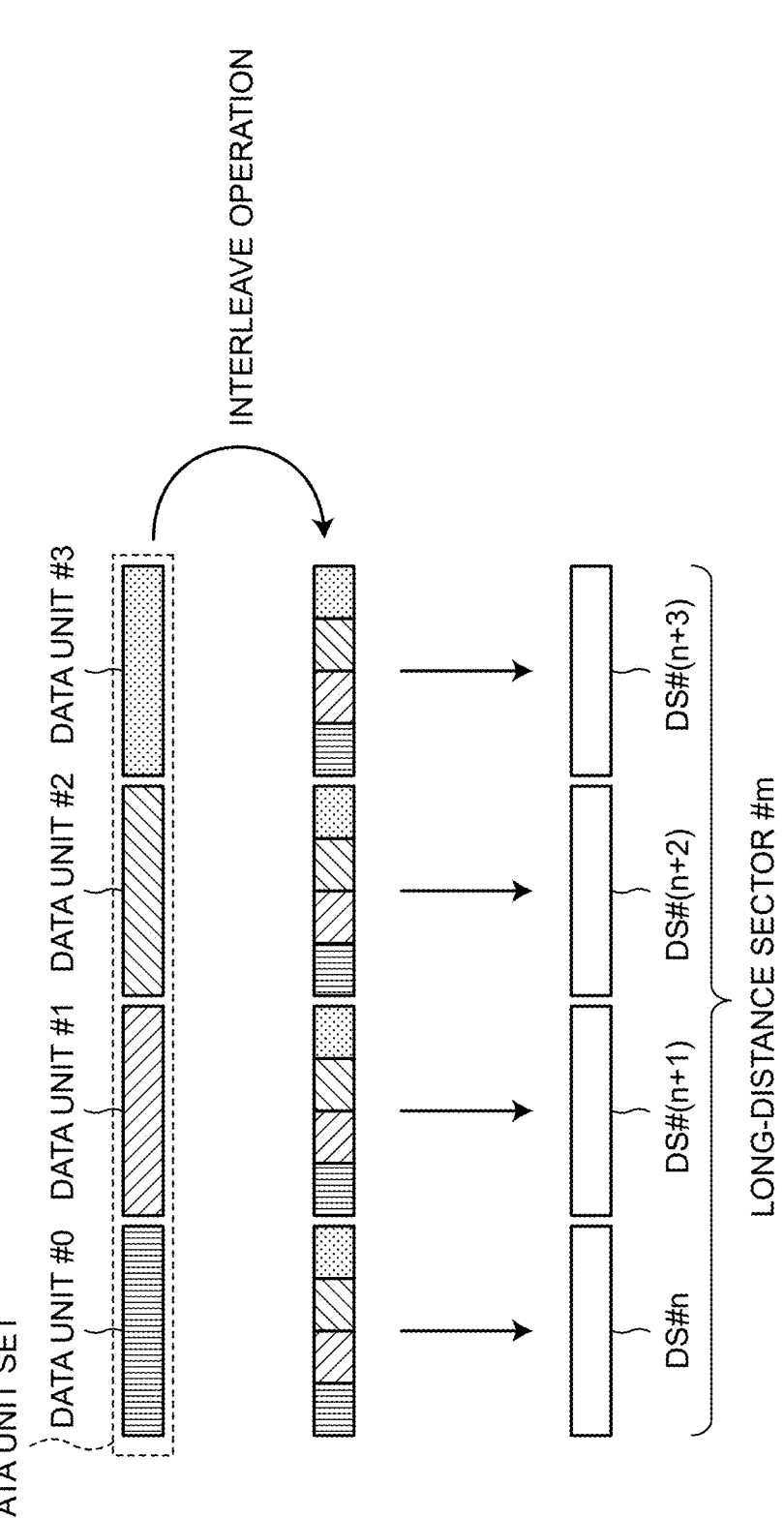
FIG. 14 is a view for describing an example of an interleave operation according to a second embodiment.

FIG. 14 is a view for describing an example of the interleave operation according to the second embodiment. The drawing illustrates an example of the interleave operation executed for a data unit set to be written to a certain long-distance sector #m. The long-distance sector #m is assumed to include data sectors #n to #(n+3). Note that both n and m are integers.

The data unit set to be written to the long-distance sector #m includes, for example, data units #0 to #3.

In the interleave operation, the controller 30 divides each of the data units #0 to #3 into four sub-data units. Then, the controller 30 changes the arrangement order of a total of sixteen sub-data units generated by the division of the data units #0 to #3 and writes the sub-data units to the long-distance sector #m. Specifically, the controller 30 distributes four sub-data units generated from the data unit #0 to the data sectors #n to #(n+3). Similarly, the controller 30 distributes four sub-data units generated from the data unit #1 to the data sectors #n to #(n+3), distributes four sub-data units generated from the data unit #2 to the data sectors #n to #(n+3), and distributes four sub-data units generated from the data unit #3 to the data sectors #n to #(n+3).

With the interleave operation, one data unit is distributed to the data sectors DS constituting the long-distance sector.

Figure 15:
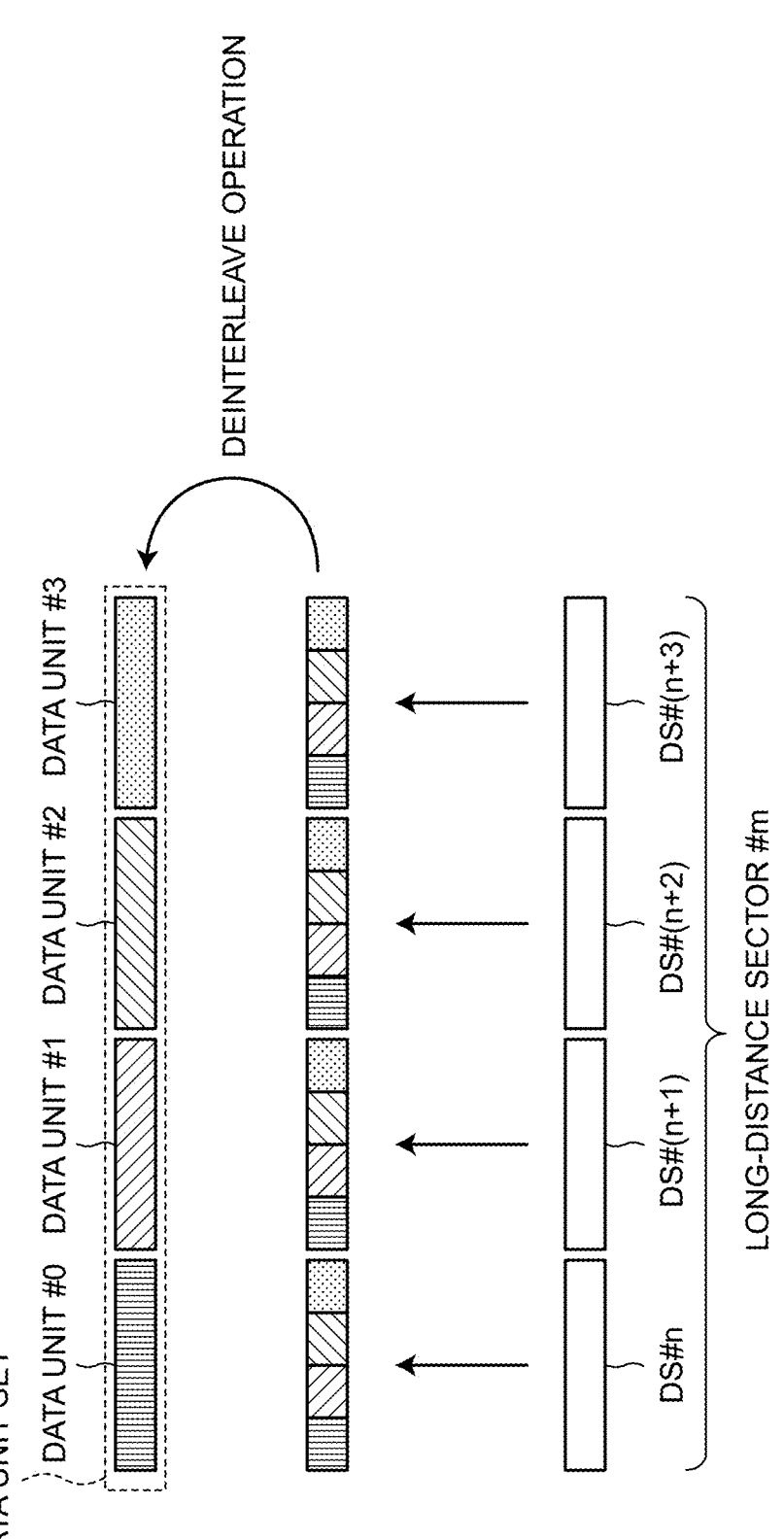
FIG. 15 is a view for describing an example of a deinterleave operation according to the second embodiment.

FIG. 15 is a view for describing an example of a deinterleave operation according to the second embodiment. The drawing illustrates an example of the deinterleave operation on data read from the long-distance sector #m.

In the long-distance sector #m, the respective data units are distributed as sub-data units and arranged in regions corresponding to four data sectors DS. In the deinterleave operation, the controller 30 returns the arrangement for each sub-data unit to the original arrangement for the data unit set read from the long-distance sector #m and having the arrangement changed in the sub-data units. As a result, the data unit set before the interleave operation in which the data unit #0, the data unit #1, the data unit #2, and the data unit #3 are arranged in this order is recovered.

Since the interleave operation and the deinterleave operation are executed in this manner, the long-distance sector #m has increased resistance to a burst error. For example, even if data read from a certain data sector DS includes a burst error part, the burst error part is distributed in a plurality of data units by the deinterleave operation. Since the respective data units have been individually subjected to the error correction coding, the distributed burst error parts are corrected by the sector error correction on the respective data units.

Note that the burst error may also occur when a width of an adjacent track is narrowed by a write operation. The narrowing of the width of the adjacent track is referred to as squeeze write. It is difficult to read data without an error from a section in which the track width is significantly narrowed by the squeeze write, so that the burst error may occur in data read from the section. When the interleave operation and the deinterleave operation are executed, even if a burst error having a length equal to or less than that of the data sector DS occurs due to local squeeze write having a length equal to or less than that of the data sector DS, the burst error can be corrected by the sector error correction.

As described above, the long-distance sector has the length over the plurality of servo sectors SV in the circumferential direction.

Figure 16:
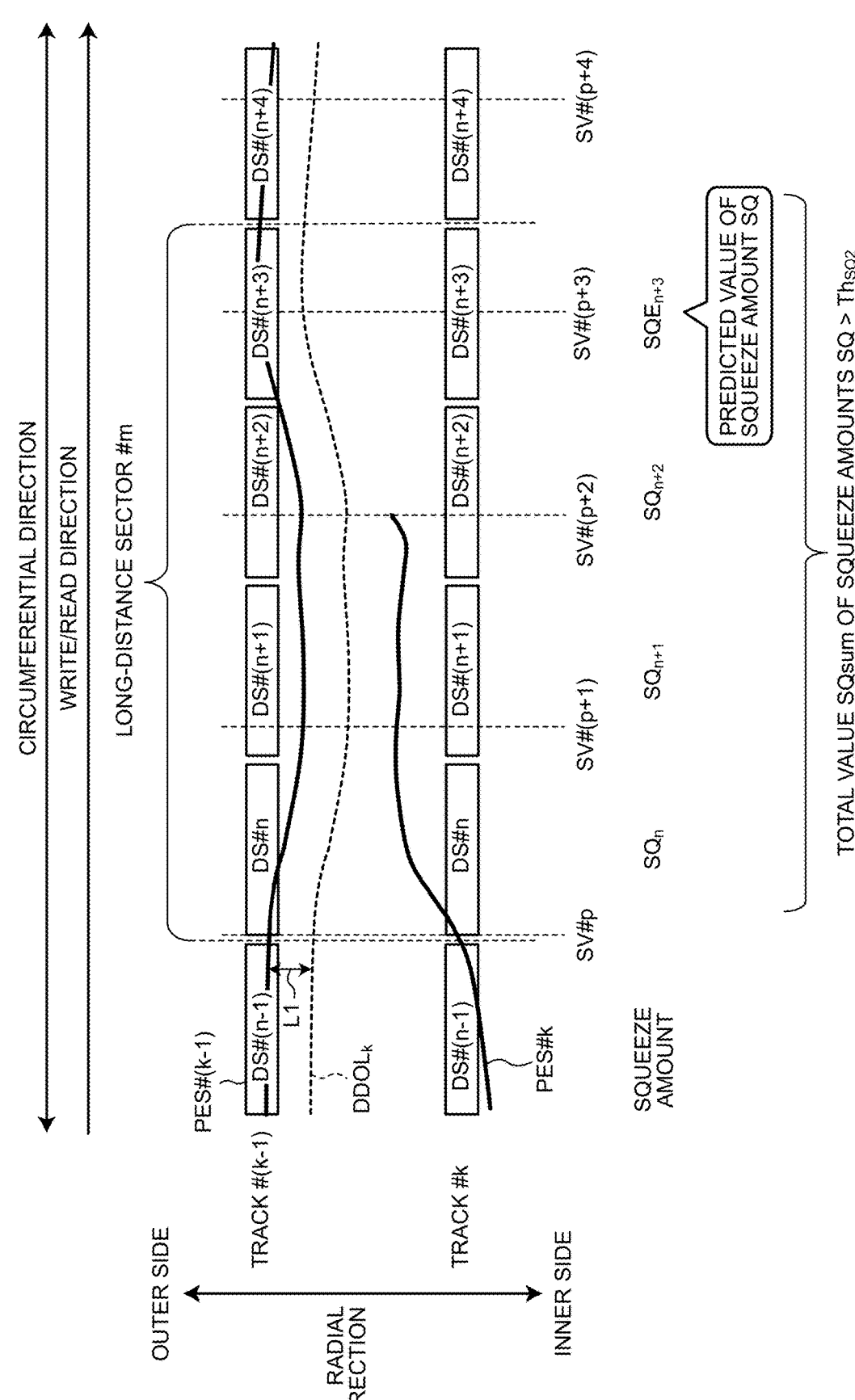
FIG. 16 is a view illustrating an example of a positional relationship between a long-distance sector and each servo sector according to the second embodiment.

FIG. 16 is a view illustrating an example of a positional relationship between the long-distance sector and each of the servo sectors SV according to the second embodiment.

In the example illustrated in FIG. 16, a range between two ends in the circumferential direction of the long-distance sector #m of a track #(k−1) includes four servo sectors SV #p to SV #(p+3). The servo sector SV #p is present at the head of a data sector DS #n (more precisely, immediately before the data sector DS #0), the servo sector SV #(p+1) is present in the middle of a data sector DS #(n+1), the servo sector SV #(p+2) is present in the middle of a data sector DS #(n+2), and the servo sector SV #(p+3) is present in the middle of a data sector DS #(n+3).

In the write operation of writing data to the long-distance sector #m of the track #k, which is a part adjacent to the long-distance sector #m of a track #(k−1), the controller 30 executes tracking control based on servo information read from at least the four servo sectors SV #p to SV #(p+3).

In addition, the controller 30 sets the dynamic drift-off level DDOL #k with a trajectory indicated by the positional error signal PES #(k−1) as a reference as in the first embodiment.

As described above, the long-distance sector has the length over the plurality of servo sectors SV, and the interleave operation is executed on the data unit set to be written to the long-distance sector. Even in a situation where the width of the adjacent track is significantly narrowed in a certain part of a certain long-distance sector so that the burst error due to the squeeze write is likely to occur in the part during a read operation to be executed later, data without an error can be acquired by the sector error correction if data can be read from another part of the long-distance sector without an error.

That is, in order to estimate whether data without an error can be acquired by the sector error correction as accurately as possible, it is required to make a determination based on the squeeze amounts SQ in all the servo sectors SV, instead of some of the servo sectors SV, included in the range between the two ends of the long-distance sector.

Therefore, the controller 30 executes an operation to be described below in the write operation on a first part which is a part of the write target track 41 adjacent to a second part. Here, the second part is a part between two ends in the circumferential direction of a certain long-distance sector (denoted as an adjacent long-distance sector) of the adjacent track.

In order to prevent data of the adjacent long-distance sector from being uncorrectable by the squeeze write, the controller 30 calculates the squeeze amount SQ at a position of each sector (each of the servo sectors SV or each of the data sectors DS) of the adjacent track based on servo data read from each of the servo sectors SV in a range from the head to the end of the first part. An operation of acquiring the squeeze amount SQ at the position of each sector (each of the servo sectors SV or each of the data sectors DS) of the adjacent track is denoted as an acquisition operation. In a case where there is a sector adjacent to a part of the first part where the magnetic head 22 has not passed yet among the respective sectors (the respective servo sectors SV or the respective data sectors DS) included in the second part, the controller 30 predicts the squeeze amount SQ in the sector adjacent to the part where the magnetic head 22 has not passed yet. Then, the controller 30 adds up the squeeze amounts SQ in all the sectors (the servo sectors SV or the data sectors DS) included in the adjacent long-distance sector to acquire a total value SQsum of the squeeze amounts SQ. The total value SQsum of the squeeze amounts SQ is numerical information indicating damage received by the data of the adjacent long-distance sector. The controller 30 compares the total value SQsum of the squeeze amounts SQ with a threshold (denoted as a second squeeze amount threshold $Th_{SQ2}$).

A value as large as possible in a numerical range in which it is guaranteed that a data unit set having no error can be acquired from the adjacent long-distance sector by the sector error correction is set as the second squeeze amount threshold $Th_{SQ2}$. Therefore, in a case where the total value of the squeeze amounts SQ is smaller than the second squeeze amount threshold $Th_{SQ2}$, it can be estimated that data without an error can be acquired from the adjacent long-distance sector. In addition, in a case where the total value of the squeeze amounts SQ is larger than the second squeeze amount threshold $Th_{SQ2}$, it can be estimated that there is a possibility that it is difficult to acquire data without an error from the adjacent long-distance sector.

In the write operation on the track #k, every time the magnetic head 22 passes over the servo sector SV, the controller 30 calculates the total value SQsum of the squeeze amounts SQ and compares the total value SQsum of the squeeze amounts with the second squeeze amount threshold $Th_{SQ2}$ for the long-distance sector of the track #(k−1) at a position corresponding to a position of the magnetic head 22.

In the example illustrated in FIG. 16, as indicated by the positional error signal #k, the magnetic head 22 passes over the servo sector SV #p and the servo sector SV #(p+1) while writing data. Then, the magnetic head 22 reaches the servo sector SV #(p+2).

When the servo information is read from the servo sector SV #(p+2) by the magnetic head 22, the controller 30 calculates a squeeze amount $SQ_n$ in the data sector DS #n of the track #(k−1), a squeeze amount $SQ_{n+1}$ in the data sector DS #(n+1) of the track #(k−1), and a squeeze amount $SQ_{n+2}$ in the data sector DS #(n+2) of the track #(k−1) based on the read servo information.

The controller 30 predicts the squeeze amount SQ in the data sector DS #(n+3) of the track #(k−1) that is the data sector DS of the track #(k−1) adjacent to the part where the magnetic head 22 has not passed yet. As a method of calculating a predicted value $SQE_{n+3}$ of the squeeze amount SQ in the data sector DS #(n+3) of the track #(k−1), various methods can be considered.

In one example, a maximum value of the squeeze amounts SQ in all the data sectors DS adjacent to a part that the magnetic head 22 has already passed among the data sectors DS included in the long-distance sector #m of the track #(k−1) (that is, the part from the servo sector SV #p to the servo sector #(p+2) of the track #k) is set as the predicted value $SQE_{n+3}$ of the squeeze amount SQ.

In another example, an average value of the squeeze amounts SQ in all the data sectors DS adjacent to the part where the magnetic head 22 has already passed among the data sectors DS included in the long-distance sector #m of the track #(k−1) is set as the predicted value $SQE_{n+3}$ of the squeeze amount.

In still another example, a trained neural network model is installed in a storage area of an electronic circuit of the controller 30. The trained neural network model is configured to, when the squeeze amounts SQ in the predetermined number of sectors (servo sectors SV or data sectors DS) are input, output the squeeze amount SQ or an estimated value of the squeeze amount SQ in one or more sectors (servo sectors SV or data sectors DS) arranged immediately after a predetermined number of sectors (servo sectors SV or data sectors DS) arranged continuously in the circumferential direction. The neural network model has, for example, three layers of an input layer, an intermediate layer, and an output layer. In each layer, there are a large number of neurons, and the neurons are combined by a certain weight. Learning means that how the weight is set in each combination is adjusted so as to minimize an output error. For example, there is a servo logic unit having a synchronization circuit that acquires the squeeze amount for each of the servo sectors SV in the controller 30, and the squeeze amount is transmitted to a servo channel unit in the controller 30. The neural network model is implemented as the circuit in the servo channel unit. The controller 30 acquires the predicted value $SQE_{n+3}$ of the squeeze amount SQ based on the trained neural network model.

In still another example, the controller 30 is provided with a circuit that is configured to, when the squeeze amounts SQ in a predetermined number of sectors (servo sectors SV or data sectors DS) arranged continuously in the circumferential direction are input, output the squeeze amounts SQ or estimated values of the squeeze amounts SQ in one or more sectors (servo sectors SV or data sectors DS) arranged immediately after the predetermined number of sectors by a regression equation. The controller 30 acquires the predicted value $SQE_{n+3}$ of the squeeze amount SQ based on the prediction by the trained regression equation.

In this manner, the controller 30 acquires one or more squeeze amounts SQ (here, four squeeze amounts $SQ_n$, $SQ_{n+1}$, $SQ_{n+2}$, and $SQE_{n+3}$) for the long-distance sector #m of the track #(k−1) in the acquisition operation.

When the squeeze amount $SQ_n$ in the data sector DS #n, the squeeze amount $SQ_{n+1}$ in the data sector DS #(n+1), the squeeze amount $SQ_{n+2}$ in the data sector DS #(n+2), and the squeeze amount $SQE_{n+3}$ in the data sector DS #(n+3) are acquired, the controller 30 calculates the total value SQsum of these. Then, the controller 30 compares the total value SQsum of the squeeze amounts with the second squeeze amount threshold $Th_{SQ2}$.

When the total value SQsum of the squeeze amounts SQ is smaller than the second squeeze amount threshold $Th_{SQ2}$, the controller 30 continues the write operation on the track #k. When the total value SQsum of the squeeze amounts SQ is larger than the second squeeze amount threshold $Th_{SQ2}$, the controller 30 interrupts the write operation and executes the protection operation.

Note that processing in a case where the total value SQsum of the squeeze amount SQ is equal to the second squeeze amount threshold $Th_{SQ2}$ can be designed in any manner by a designer. For example, the controller 30 may continue the write operation or may interrupt the write operation and execute the protection operation. Here, the controller 30 is assumed to continue the write operation when the total value SQsum of the squeeze amounts is equal to the second squeeze amount threshold $Th_{SQ2}$.

In the example illustrated in FIG. 16, sector ends of the long-distance sectors are aligned between the tracks 41 (for example, between the track #(k−1) and the track #k) arranged in the radial direction. The sector ends of the long-distance sectors are not necessarily aligned between those tracks 41 arranged in the radial direction.

As described in the first embodiment, the data sectors DS provided in the track 41 vary in quality. Thus, the respective long-distance sectors also vary in quality. In the second embodiment, the controller 30 changes the second squeeze amount threshold $Th_{SQ2}$ in the track 41 according to the quality of the long-distance sectors of the adjacent track. As a result, the controller 30 can appropriately evaluate damage received by the data of the adjacent track, and the frequency of execution of the protection operation is reduced.

In the second embodiment, in one example, an average value of bit error rates of all the data sectors DS constituting the long-distance sector is used as an index of the quality of the long-distance sector. The average value of the bit error rates of all the data sectors DS constituting the long-distance sector is denoted as a bit error rate of the long-distance sector.

The controller 30 acquires the second squeeze amount threshold $Th_{SQ2}$ for each of the long-distance sectors based on Formula (4) described below. $Th_{SQ2base}$ is a value as large as possible in a numerical range in which it is guaranteed that a data unit set without an error can be acquired by the sector error correction from a long-distance sector having the largest bit error rate among the long-distance sectors of the adjacent track. Mar2 is a relaxation amount determined according to the bit error rate of the data sector DS.

$$Th_{SQ2} = Th_{SQ2base} + Mar2 \qquad (4)$$

The controller 30 individually calculates the threshold relaxation amount Mar2 for each of the long-distance sectors of the adjacent track based on the preset correspondence information 281a.

An example of an operation of setting the second squeeze amount threshold $Th_{SQ2}$ based on the bit error rate of the long-distance sector will be described with reference to FIGS. 17 and 18.

Figure 17:
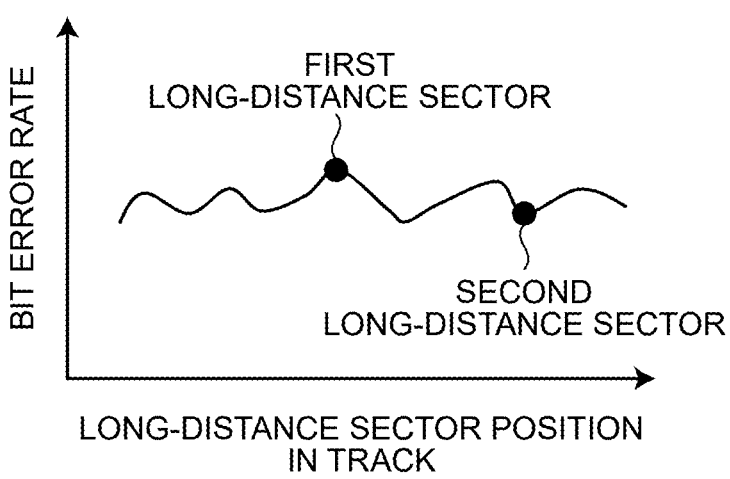
FIG. 17 is a view illustrating an example of a bit error rate of each long-distance sector included in a track that is an adjacent track during a write operation according to the second embodiment.

FIG. 17 is a view illustrating an example of the bit error rate of each long-distance sector included in the track 41 which is the adjacent track during the write operation according to the second embodiment. In the drawing, the horizontal axis represents a position of each long-distance sector in the track 41 which is the adjacent track. The vertical axis represents the bit error rate.

It can be seen from FIG. 17 that the bit error rates of the long-distance sectors vary in the track 41. For example, a bit error rate of a first long-distance sector is the maximum in the track 41. That is, the first long-distance sector has the lowest quality in the track 41. In addition, for example, a bit error rate of a second long-distance sector is the minimum in the track 41. That is, the second long-distance sector has the highest quality in the track 41.

Figure 18:
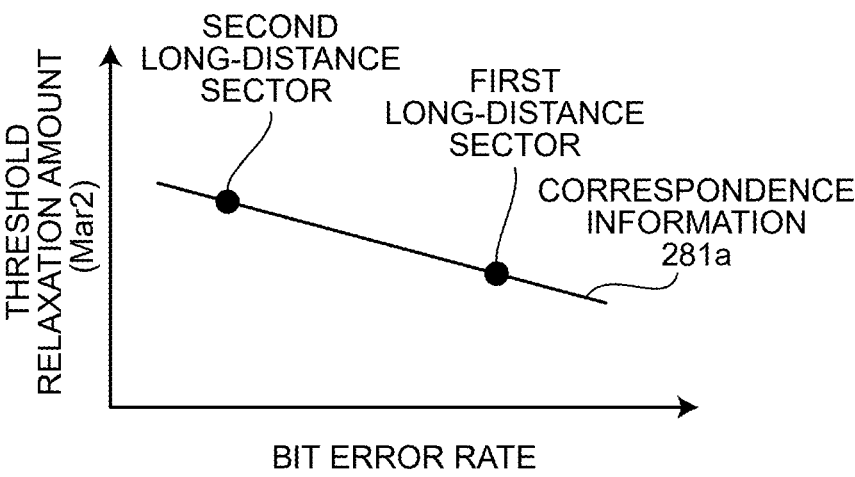
FIG. 18 is a view illustrating an example of correspondence information according to the second embodiment.

FIG. 18 is a view illustrating an example of the correspondence information 281a according to the second embodiment. In the drawing, the horizontal axis represents the bit error rate of the long-distance sector, and the vertical axis represents the threshold relaxation amount Mar2.

As illustrated in FIG. 18, according to the correspondence information 281a, a relationship between the bit error rate and the threshold relaxation amount Mar2 is defined such that the threshold relaxation amount Mar2 increases as the bit error rate decreases. Therefore, for example, the threshold relaxation amount Mar2 in the second long-distance sector is larger than the threshold relaxation amount Mar2 in the first long-distance sector. According to the correspondence information 281a, the second squeeze amount threshold $Th_{SQ2}$ increases as the quality of the long-distance sector of the adjacent track increases. Therefore, even if the squeeze amount SQ is the same value, damage to data of a long-distance sector having higher quality of the adjacent track can be estimated to be smaller than damage to data of a long-distance sector having lower quality of the adjacent track.

The correspondence information 281a is generated in a manufacturing process and stored in a predetermined non-volatile storage area (for example, the FROM 28), which is similar to the correspondence information 281 of the first embodiment.

Figure 19:
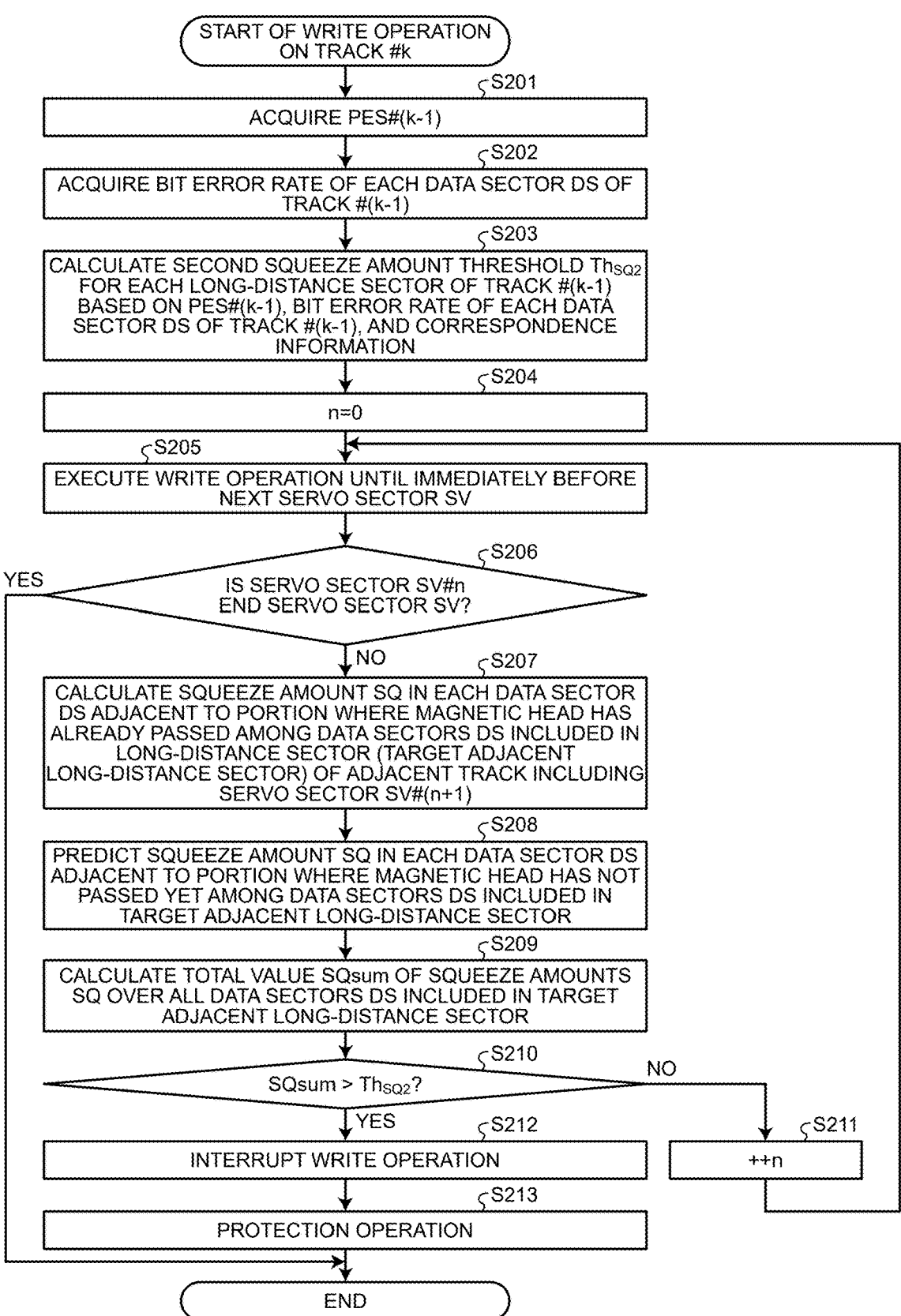
FIG. 19 is a flowchart illustrating an example of an operation of a magnetic disk apparatus according to the second embodiment.

FIG. 19 is a flowchart illustrating an example of an operation of the magnetic disk apparatus 1 according to the second embodiment. The drawing illustrates a series of processing of the write operation on the track #k.

First, the controller 30 acquires the positional error signal PES #(k−1) of the adjacent track, namely, the track #(k−1) (S201).

The controller 30 refers to the measured BER information 282 to acquire the bit error rate of each of the data sectors DS of the track #(k−1) (S202).

The controller 30 calculates the second squeeze amount threshold $Th_{SQ2}$ for each long-distance sector of the track #(k−1) based on the positional error signal PES #(k−1), the bit error rate of each of the data sectors DS of the track #(k−1), and the correspondence information 281a (S203).

In S203, the controller 30 calculates the bit error rate for each long-distance sector of the track #(k−1) based on the bit error rate of each of the data sectors DS of the track #(k−1). Then, the controller 30 acquires the threshold relaxation amount Mar2 for each long-distance sector of the track #(k−1) based on the bit error rate for each long-distance sector and the correspondence information 281a. Then, the controller 30 calculates the second squeeze amount threshold $Th_{SQ2}$ for each long-distance sector of the adjacent track by using the above-described Formula (4).

Subsequently, the controller 30 initializes a variable n to zero (S204). The variable n is a variable in which an ID of the servo sector SV is stored.

The controller 30 executes the write operation on a section from immediately after a servo sector SV #n to immediately before the servo sector SV next to the servo sector SV #n (S205). At this time, the controller 30 reads the servo information from the servo sector SV subsequent to the servo sector SV #n and acquires the PES based on the read servo information.

The controller 30 determines whether the servo sector SV #n is the end servo sector SV (S206).

In a case where the servo sector SV #n is the end servo sector SV #k (S206: Yes), the write operation on the track #k is completed.

When the servo sector SV #n is not the end servo sector SV (S206: No), the controller 30 calculates the squeeze amount SQ in each of the data sectors DS adjacent to a part where the magnetic head 22 has already passed over of a long-distance sector (denoted as a target adjacent long-distance sector) of the adjacent track including a circumferential position of the servo sector SV #(n+1) (S207).

Further, the controller 30 predicts the squeeze amount SQ (that is, a predicted amount SQE of the squeeze amount SQ) in each of the data sectors DS adjacent to a part of the target adjacent long-distance sector where the magnetic head 22 has not passed yet (S208).

The controller 30 calculates the total value SQsum of the squeeze amounts SQ over all the data sectors DS included in the target adjacent long-distance sector (S209).

The controller 30 determines whether the total value SQsum is larger than the second squeeze amount threshold $Th_{SQ2}$ for the target adjacent long-distance sector (S210).

In a case where the total value SQsum is not larger than the second squeeze amount threshold $Th_{SQ2}$ for the target adjacent long-distance sector (S210: No), the controller 30 increments a value of the variable n by one (S211), and the control transitions to S205.

In a case where the total value SQsum is larger than the second squeeze amount threshold $Th_{SQ2}$ for the target adjacent long-distance sector (S210: Yes), the controller 30 interrupts the write operation on the track #k (S212). Then, the controller 30 executes the protection operation (S213), and a series of operations ends.

In this manner, according to the second embodiment, the controller 30 calculates the second squeeze amount threshold $Th_{SQ2}$ for each long-distance sector of the adjacent track based on the quality of each long-distance sector of the adjacent track. The controller 30 executes the following operation in the write operation on a first part that is a part adjacent to a second part that is a part between two ends in the circumferential direction of the target adjacent long-distance sector. That is, the controller 30 calculates the squeeze amount SQ in each of the data sectors DS included in the target adjacent long-distance sector based on servo information read from one or more servo sectors SV where the magnetic head 22 has passed among the two or more servo sectors SV included in the first part. Then, the controller 30 compares the total value SQsum of the squeeze amounts SQ in each of the data sectors DS included in the target adjacent long-distance sector with the second squeeze amount threshold $Th_{SQ2}$ for the target adjacent long-distance sector. The controller 30 executes interruption of the write operation and the protection operation of protecting the data of the adjacent track based on a comparison result between the total value SQsum of the squeeze amounts SQ and the second squeeze amount threshold $Th_{SQ2}$ for the target adjacent long-distance sector.

Therefore, the frequency of execution of the protection operation is reduced as in the first embodiment. When the protection operation is executed, the time required to complete the write operation increases. By reducing the frequency of execution of the protection operation, an increase in the time required for the write operation is suppressed. That is, performance is improved. In addition, a storage capacity of the magnetic disk apparatus 1 can be increased by reducing a design value of a track width (or track pitch).

Note that the squeeze amount SQ in the data sector DS adjacent to the part of the first part where the magnetic head 22 has not passed yet in the second part is predicted according to the second embodiment.

In addition, according to the second embodiment, the second squeeze amount threshold $Th_{SQ2}$ according to the quality of the long-distance sector is calculated by the calculation based on the correspondence information 281a and Formula (4). Therefore, in a case where the adjacent track includes a certain long-distance sector (denoted as a third long-distance sector) and another long-distance sector (denoted as a fourth long-distance sector) and quality of the third long-distance sector is higher than quality of the fourth long-distance sector, the second squeeze amount threshold $Th_{SQ2}$ for the third long-distance sector is larger than the second squeeze amount threshold $Th_{SQ2}$ for the fourth long-distance sector.

Therefore, the controller 30 can appropriately evaluate the damage received by the data of the adjacent track, and the frequency of execution of the protection operation is reduced.

In addition, according to the second embodiment, when the total value SQsum of the squeeze amounts SQ is larger than the second squeeze amount threshold $Th_{SQ2}$, the controller 30 executes the interruption of the write operation and the protection operation. When the total value SQsum of the squeeze amounts SQ is smaller than the second squeeze amount threshold $Th_{SQ2}$, the controller 30 continues the write operation.

Therefore, it is possible to prevent the data of the target adjacent long-distance sector from being uncorrectable by the sector error correction due to the squeeze write.

Note that, according to the example illustrated in FIG. 19, the controller 30 immediately executes the interruption of the write operation and the protection operation when the total value SQsum of the squeeze amounts SQ is larger than the second squeeze amount threshold $Th_{SQ2}$. A condition for the interruption of the write operation and the execution of the protection operation is not limited thereto.

For example, the controller 30 continues the write operation even when the total value SQsum of the squeeze amounts SQ is larger than the second squeeze amount threshold $Th_{SQ2}$, and accumulates an excess amount of the total value SQsum of the squeeze amounts SQ over the second squeeze amount threshold $Th_{SQ2}$ for parts of the adjacent track adjacent to a section in which the write is completed. Then, the controller 30 estimates whether a track read error occurs based on the amount obtained by the accumulation. When it is estimated that the track read error occurs, the controller 30 may execute the interruption of the write operation and the protection operation.

Note that the controller 30 calculates the squeeze amount SQ in each of the data sectors DS included in the target adjacent long-distance sector in the second embodiment. As long as the squeeze amounts SQ at a plurality of positions included in the target adjacent long-distance sector are calculated, the controller 30 does not necessarily calculate the squeeze amount SQ in each of the data sectors DS included in the target adjacent long-distance sector.

In addition, in the second embodiment, the controller 30 may tighten a write permission range in the radial direction in the protection operation and resume the write operation after the tightening of the write permission range as in the first embodiment.

Alternatively, in the protection operation, the controller 30 may refrain from writing data to a section between a circumferential position where the write operation is interrupted to a predetermined circumferential position.

In addition, the controller 30 uses the bit error rate as the index of the quality as in the first embodiment. The index of the quality is not limited to the bit error rate.

Third Embodiment

According to the first embodiment, the controller 30 individually calculates the first squeeze amount threshold $Th_{SQ1}$ for each of the servo sectors SV at the first positions based on the quality of one or more data sectors DS of the adjacent track at one or more second positions corresponding to each of the first positions. The first squeeze amount threshold $Th_{SQ1}$ may be common among all the servo sectors SV, and the controller 30 may individually calculate a weighting coefficient w1 for each of the servo sectors SV instead of the first squeeze amount threshold $Th_{SQ1}$.

That is, the controller 30 does not perform conversion based on the quality of one or more data sectors DS of the adjacent track with respect to the first squeeze amount threshold $Th_{SQ1}$, but multiplies a squeeze amount by the weighting coefficient w1 based on the quality of one or more data sectors DS of the adjacent track.

In a write operation, when the magnetic head 22 passes over the servo sector SV, the controller 30 multiplies the squeeze amount by the weighting coefficient w1. The controller 30 then calculates the cumulative damage evaluation amount CDE that is the first amount obtained by accumulating the damage evaluation amounts DE each being an excess amount of the squeeze amount, which has been multiplied by the weighting coefficient w1, over the first squeeze amount threshold $Th_{SQ1}$ for all the data sectors DS included in a range adjacent to a part in the circumferential direction in which write has been completed. Then, the controller 30 compares the cumulative damage evaluation amount CDE with the track read error threshold $Th_{CDE}$, and executes the interruption of the write operation and the protection operation of protecting data of a second track based on a comparison result between the cumulative damage evaluation amount CDE and the track read error threshold $Th_{CDE}$.

Here, the controller 30 makes the weighting coefficient w1 for the servo sector SV with higher quality in the one or more data sectors DS of the adjacent track smaller than the weighting coefficient w1 for the servo sector SV with lower quality in the one or more data sectors DS of the adjacent track. That is, the controller 30 decreases the weighting coefficient w1 instead of increasing the first squeeze amount threshold $Th_{SQ1}$, and increases the weighting coefficient w1 instead of decreasing the first squeeze amount threshold $Th_{SQ1}$.

Therefore, the controller 30 can appropriately evaluate damage received by data of the adjacent track, and the frequency of execution of the protection operation is reduced.

Other matters are the same as those of the first embodiment except that the weighting coefficient w1 is adjusted instead of the first squeeze amount threshold $Th_{SQ1}$.

Note that the controller 30 may multiply the squeeze amount by the weighting coefficient w1 corresponding to the magnitude of an excess amount of the magnetic head 22 over a sector read error boundary. In addition, the controller 30 may increase the weighting coefficient w1 according to the number of times the magnetic head 22 exceeds the sector read error boundary. That is, the weighting coefficient w1 may be small at the head of the adjacent track, and the weight w1 may be increased in the latter half of the adjacent track.

Fourth Embodiment

In the second embodiment, the controller 30 calculates the second squeeze amount threshold $Th_{SQ2}$ for each long-distance sector of the adjacent track based on the quality of each long-distance sector of the adjacent track. The controller 30 may calculate a weighting coefficient w2 to be multiplied by the total value SQsum of the squeeze amounts SQ instead of the second squeeze amount threshold $Th_{SQ2}$.

That is, the controller 30 sets the second squeeze amount threshold $Th_{SQ2}$ to be common among all long-distance sectors of an adjacent track, and calculates the weighting coefficient w2 based on quality of each of the long-distance sectors of the adjacent track. The controller 30 executes the following operation in a write operation on a first part that is a part adjacent to a second part that is a part between two ends in the circumferential direction of a target adjacent long-distance sector. The controller 30 calculates the squeeze amount SQ in each of the data sectors DS included in the target adjacent long-distance sector based on servo information read from one or more servo sectors SV where the magnetic head 22 has passed over among the two or more servo sectors SV included in the first part. Then, the controller 30 calculates the total value SQsum of the squeeze amounts SQ in the respective data sectors DS included in the target adjacent long-distance sector. Then, the controller 30 multiplies the total value SQsum by the weighting coefficient w2 for the target adjacent long-distance sector, and compares the total value SQsum multiplied by the weighting coefficient w2 with the second squeeze amount threshold $Th_{SQ2}$. The controller 30 executes interruption of the write operation and a protection operation of protecting data of the adjacent track based on a comparison result between the total value SQsum multiplied by the weighting coefficient w2 and the second squeeze amount threshold $Th_{SQ2}$ for the target adjacent long-distance sector.

Here, in a case where the adjacent track includes a certain long-distance sector (denoted as a third long-distance sector) and another long-distance sector (denoted as a fourth long-distance sector) and quality of the third long-distance sector is higher than quality of the fourth long-distance sector, the controller 30 sets the weighting coefficient w2 for the third long-distance sector to be smaller than the weighting coefficient w2 for the fourth long-distance sector.

Therefore, the controller 30 can appropriately evaluate damage received by data of the adjacent track, and the frequency of execution of the protection operation is reduced.

Other matters are the same as those of the first embodiment except that the weighting coefficient w2 is adjusted instead of the second squeeze amount threshold $Th_{SQ2}$.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk on which tracks are provided, the tracks
including servo sectors in which servo information is
recorded, the servo sectors being arranged at intervals
in a circumferential direction of the magnetic disk, the
tracks including a first track and a second track, the
second track being adjacent to the first track in a radial
direction of the magnetic disk and being subjected to
write before the first track;
a magnetic head configured to write and read data to and
from the magnetic disk; and
a controller configured to
calculate a first threshold relative to each of multiple
first positions located in the circumferential direc-
tion, the first threshold being individually calculated
for each of the multiple first positions based on
quality of one or more of multiple second positions
located in the circumferential direction, the one or
more of the multiple second positions corresponding
to the multiple first positions,
start a write operation on the first track,
execute a first operation when the magnetic head passes
over each of the servo sectors during the write
operation, the first operation being an operation of
calculating a first amount and comparing the first
amount with a second threshold, the first operation
being executed based on the servo information read
every time the magnetic head passes over each of the
servo sectors, the first amount being obtained by
accumulating an excess amount of a squeeze amount
over the first threshold for all second positions
included in a range adjacent to a part in the circum-
ferential direction where write by the write operation
is completed among the multiple second positions,
the squeeze amount being a narrowed amount of a
width of the second track from a design value caused
by the write operation, and
perform interruption of the write operation and perform
a protection operation of protecting data of the
second track, based on a comparison result between
the first amount and the second threshold.

2. The magnetic disk apparatus according to claim 1,
wherein
the multiple first positions include a third position and a
fourth position,
quality of one or more of the second positions in the
second track corresponding to the third position is
higher than quality of one or more of the second
positions in the second track corresponding to the
fourth position, and
the first threshold relative to the third position is larger
than the first threshold relative to the fourth position.

3. The magnetic disk apparatus according to claim 1,
wherein the controller is configured to
perform the interruption of the write operation and per-
form the protection operation when the first amount is
larger than the second threshold, and
continue the write operation when the first amount is
smaller than the second threshold.

4. The magnetic disk apparatus according to claim 1,
wherein the multiple first positions constitute a group of
circumferential positions of the servo sectors arranged on
the first track.

5. The magnetic disk apparatus according to claim 1,
wherein
the second track includes data sectors, and
the multiple second positions constitute a group of cir-
cumferential positions of the data sectors.

6. The magnetic disk apparatus according to claim 5,
wherein
the multiple first positions constitute a group of positions
of the servo sectors arranged in the first track, and
one or more of the second positions corresponding to a
fifth position that is one of the multiple first positions
are the second positions included in a section in the
circumferential direction between the servo sector
where the magnetic head passes over immediately
before the fifth position and the servo sector where the
magnetic head passes over immediately after the fifth
position.

7. The magnetic disk apparatus according to claim 1,
wherein
the second track includes data sectors,
the data sectors include a data sector in which an error
correction code for error correction in a unit of the
second track is stored, and
the second threshold is a value corresponding to a cor-
rection limit of the error correction.

8. The magnetic disk apparatus according to claim 1,
wherein the controller is configured to
tighten a write permission range in the radial direction
during the protection operation, and
resume the write operation after the tightening of the write
permission range.

9. The magnetic disk apparatus according to claim 1,
wherein the controller is configured to refrain from writing
data to a section between a circumferential position where
the write operation is interrupted and a predetermined cir-
cumferential position during the protection operation.

10. The magnetic disk apparatus according to claim 1,
wherein the quality of one or more of the multiple second
positions is a bit error rate.

11. A magnetic disk apparatus comprising:
a magnetic disk on which tracks are provided, the tracks
including servo sectors in which servo information is
recorded, the servo sectors being arranged at intervals
in a circumferential direction of the magnetic disk, each
of the tracks including long-distance sectors, each of
the long-distance sectors being a region in which data
is written and being a region having a length in the
circumferential direction over two or more servo sec-
tors of the servo sectors, the tracks including a first
track and a second track, the second track being adja-
cent to the first track in a radial direction of the
magnetic disk and being subjected to write before the
first track;
a magnetic head configured to write and read data to and
from the magnetic disk; and
a controller configured to
calculate a first threshold individually for each of first
long-distance sectors, which are the long-distance
sectors provided in the second track, the first thresh-
old being calculated based on quality of each of the
first long-distance sectors,
in a write operation on a first part on the first track, the
first part being a part adjacent to a second part, the
second part being a part between two ends of a
second long-distance sector in the circumferential
direction, the second long-distance sector being one
of the first long-distance sectors,
calculate squeeze amounts at first positions in the
circumferential direction included in the second
long-distance sector based on the servo information read from one or more of the servo sectors where the magnetic head passes over among the two or more of the servo sectors included in the first part, the squeeze amounts each being a narrowed amount of a width of the second track from a design value caused by the write operation, compare a total value of the squeeze amounts at the first positions with the first threshold for the second long-distance sector, and perform interruption of the write operation and perform a protection operation of protecting data of the second track, based on a comparison result between the total value and the first threshold for the second long-distance sector.

12. The magnetic disk apparatus according to claim 11, wherein the controller is configured to predict the squeeze amount at each of the first positions included in part of the second part adjacent to part of the first part where the magnetic head has not passed yet.

13. The magnetic disk apparatus according to claim 11, wherein the first long-distance sectors include a third long-distance sector and a fourth long-distance sector having higher quality than the third long-distance sector, and the first threshold relative to the third long-distance sector is larger than the first threshold relative to the fourth long-distance sector.

14. The magnetic disk apparatus according to claim 11, wherein the controller is configured to perform the interruption of the write operation and perform the protection operation when the total value is larger than the first threshold, and continue the write operation when the total value is smaller than the first threshold.

15. The magnetic disk apparatus according to claim 11, wherein the second long-distance sector includes data sectors, and the first positions constitute a group of circumferential positions of the data sectors.

16. The magnetic disk apparatus according to claim 11, wherein the controller is configured to tighten a write permission range in the radial direction during the protection operation, and resume the write operation after the tightening of the write permission range.

17. The magnetic disk apparatus according to claim 11, wherein the controller is configured to refrain from writing data to a section between a circumferential position where the write operation is interrupted and a predetermined circumferential position during the protection operation.

18. The magnetic disk apparatus according to claim 11, wherein the quality of each of the first long-distance sectors is a bit error rate.

19. A magnetic disk apparatus comprising:

a magnetic disk on which tracks are provided, the tracks including servo sectors in which servo information is recorded, the servo sectors being arranged at intervals in a circumferential direction of the magnetic disk, the tracks including a first track and a second track, the second track being adjacent to the first track in a radial direction of the magnetic disk and being subjected to write before the first track;

a magnetic head configured to write and read data to and from the magnetic disk; and a controller configured to calculate a weighting coefficient relative to each of multiple first positions located in the circumferential direction, the weighting coefficient being individually calculated for each of the multiple first positions based on quality of one or more of multiple second positions located in the circumferential direction, the one or more of the multiple second positions corresponding to the multiple first positions, start a write operation on the first track, execute a first operation when the magnetic head passes over each of the servo sectors during the write operation, the first operation being an operation of acquiring a squeeze amount that is a narrowed amount of a width of the second track from a design value caused by the write operation, the first operation being executed based on the servo information read every time the magnetic head passes over each of the servo sectors, multiplying the squeeze amount by the weighting coefficient, calculating a first amount obtained by accumulating an excess amount of the squeeze amount multiplied by the weighting coefficient over a first threshold for all second positions included in a range adjacent to a part in the circumferential direction where write by the write operation is completed among the second positions, and comparing the first amount with a second threshold, and perform interruption of the write operation and perform a protection operation of protecting data of the second track, based on a comparison result between the first amount and the second threshold.

20. A magnetic disk apparatus comprising:

a magnetic disk on which tracks are provided, the tracks including servo sectors in which servo information is recorded, the servo sectors being arranged at intervals in a circumferential direction of the magnetic disk, each of the tracks including long-distance sectors, each of the long-distance sectors being a region in which data is written and being a region having a length in the circumferential direction over two or more servo sectors of the servo sectors, the tracks including a first track and a second track, the second track being adjacent to the first track in a radial direction of the magnetic disk and being subjected to write before the first track;

a magnetic head configured to write and read data to and from the magnetic disk; and a controller configured to calculate a weighting coefficient individually for each of first long-distance sectors that are the long-distance sectors provided in the second track, the first threshold being calculated based on quality of each of the first long-distance sectors, in a write operation on a first part on the first track, the first part being a part adjacent to a second part, the second part being a part between two ends of a second long-distance sector in the circumferential direction, the second long-distance sector being one of the first long-distance sectors, calculate squeeze amounts at first positions in the circumferential direction included in the second long-distance sector based on the servo information read from one or more of the servo sectors where the magnetic head passes over among the two or more of the servo sectors included in the first part, the squeeze amounts each being a narrowed amount of a width of the second track from a design value caused by the write operation, multiply a total value of the squeeze amounts at the first positions by the weighting coefficient and compare the total value multiplied by the weighting coefficient with a first threshold relative to the second long-distance sector, and perform interruption of the write operation and perform a protection operation of protecting data of the second track, based on a comparison result between the total value multiplied by the weighting coefficient and the first threshold for the second long-distance sector.

* * * * *